US012269044B2

(12) United States Patent
Kim et al.

(10) Patent No.: US 12,269,044 B2
(45) Date of Patent: Apr. 8, 2025

(54) AIR CONDITIONER

(71) Applicant: LG ELECTRONICS INC., Seoul (KR)

(72) Inventors: Hongseok Kim, Seoul (KR); Hyunpil Ha, Seoul (KR); Keunman Park, Seoul (KR); Junhyeok Kim, Seoul (KR); Simwon Chin, Seoul (KR); Heesik Choi, Seoul (KR); Gyuyeol Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 17/779,791

(22) PCT Filed: Nov. 25, 2020

(86) PCT No.: PCT/KR2020/016756
§ 371 (c)(1),
(2) Date: May 25, 2022

(87) PCT Pub. No.: WO2021/107584
PCT Pub. Date: Jun. 3, 2021

(65) Prior Publication Data

US 2023/0001427 A1 Jan. 5, 2023

(30) Foreign Application Priority Data

Nov. 25, 2019 (KR) ........................ 10-2019-0151858
Jan. 15, 2020 (KR) ........................ 10-2020-0005106

(51) Int. Cl.
*B03C 3/08* (2006.01)
*B03C 3/36* (2006.01)
(Continued)

(52) U.S. Cl.
CPC ................ *B03C 3/08* (2013.01); *B03C 3/368* (2013.01); *B03C 3/47* (2013.01); *B03C 3/86* (2013.01); *F24F 8/194* (2021.01)

(58) Field of Classification Search
None
See application file for complete search history.

(56) References Cited

U.S. PATENT DOCUMENTS

2010/0132562 A1 6/2010 Noh et al.
2015/0290352 A1 10/2015 Ota et al.
2020/0179946 A1 * 6/2020 Yu ............................ B03C 3/82

FOREIGN PATENT DOCUMENTS

CN 101105607 1/2008
CN 105268553 1/2016
(Continued)

OTHER PUBLICATIONS

JPH0810650A_ENG (Espacenet machine translation of Hara) (Year: 1996).*
(Continued)

*Primary Examiner* — Gabriel E Gitman
(74) *Attorney, Agent, or Firm* — KED & ASSOCIATES, LLP

(57) ABSTRACT

An air conditioner is provided that includes a dust collecting filter assembly that collects foreign substances from air suctioned in through an inlet. The dust collecting filter assembly includes a high-voltage electrode film, a ground electrode film disposed parallel to face the high-voltage electrode film, a separator film disposed between the high-voltage electrode film and the ground electrode film so that the high-voltage electrode film and the ground electrode film are spaced apart by a predetermined interval, and a fastener
(Continued)

that fastens the high-voltage electrode film, the ground electrode film, and the separator film together to integrate them.

20 Claims, 28 Drawing Sheets

(51) Int. Cl.

| | |
|---|---|
| ***B03C 3/47*** | (2006.01) |
| ***B03C 3/86*** | (2006.01) |
| ***F24F 8/192*** | (2021.01) |

(56) References Cited

FOREIGN PATENT DOCUMENTS

| | | | |
|---|---|---|---|
| CN | 107051724 | | 8/2017 |
| CN | 110461477 | | 11/2019 |
| EP | 0 658 685 | | 6/1995 |
| JP | 08-10650 | | 1/1996 |
| JP | H0810650 A | * | 1/1996 |
| JP | 2007-083203 | | 4/2007 |
| JP | 2009-095799 | | 5/2009 |
| JP | 4915073 | | 4/2012 |
| KR | 20-2009-0009549 | | 9/2009 |
| KR | 10-2012-0136795 | | 12/2012 |
| KR | 10-2018-0034352 | | 4/2018 |
| KR | 10-2018-0090563 | | 8/2018 |
| KR | 10-2019-0122445 | | 10/2019 |
| WO | WO 2018/143742 | | 8/2018 |

OTHER PUBLICATIONS

International Search Report dated Feb. 24, 2021 issued in Application No. PCT/KR2020/016756.

European Search Report issued in Application No. 20893949.6 dated Nov. 15, 2023.

Chinese Office Action issued in Application No. 202080081183.8 dated Feb. 11, 2023.

Korean Office Action issued in Application No. 10-2019-0151858 dated Oct. 18, 2024.

* cited by examiner

[FIG. 1]
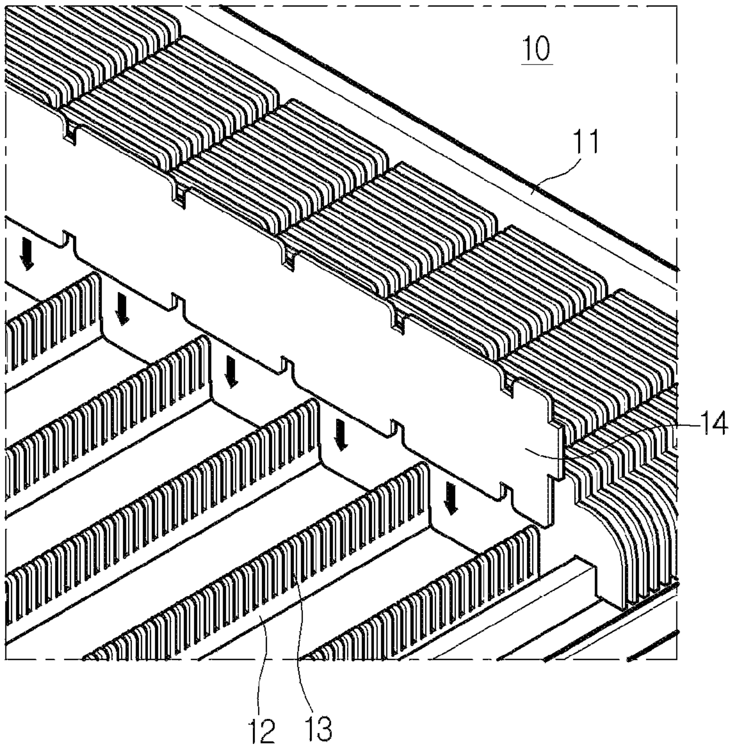

[FIG. 2]
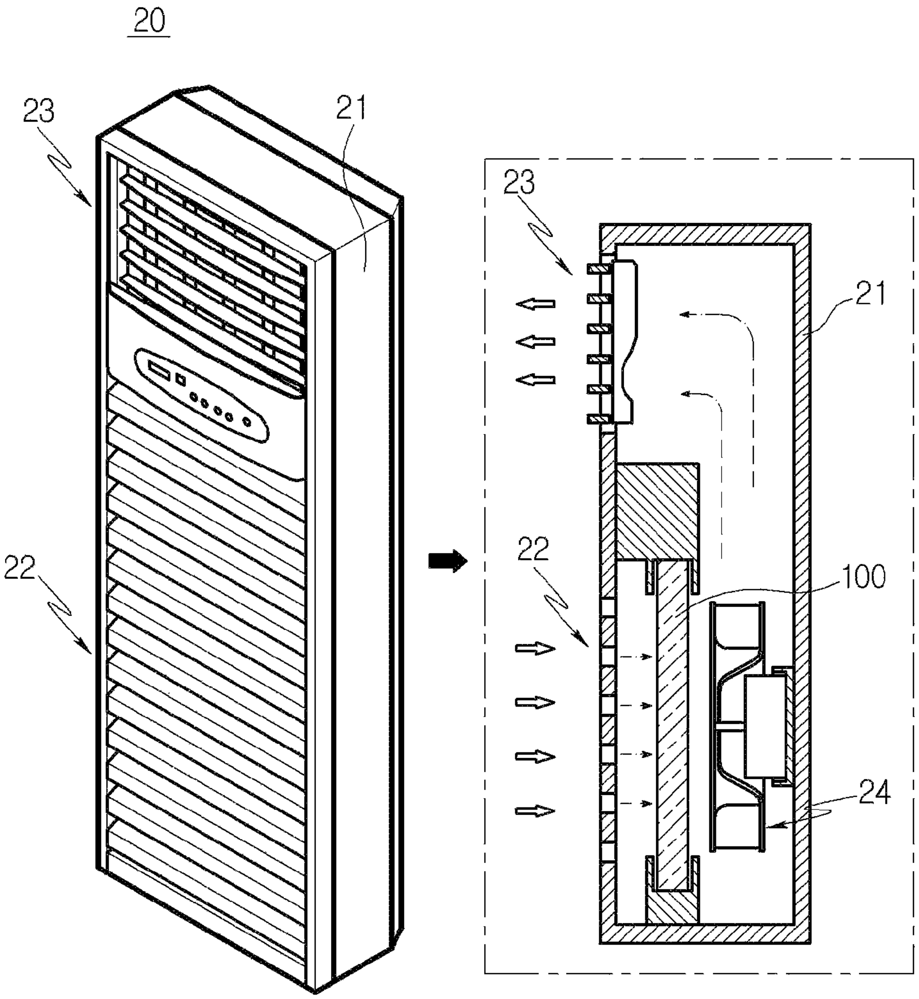

[FIG. 3]
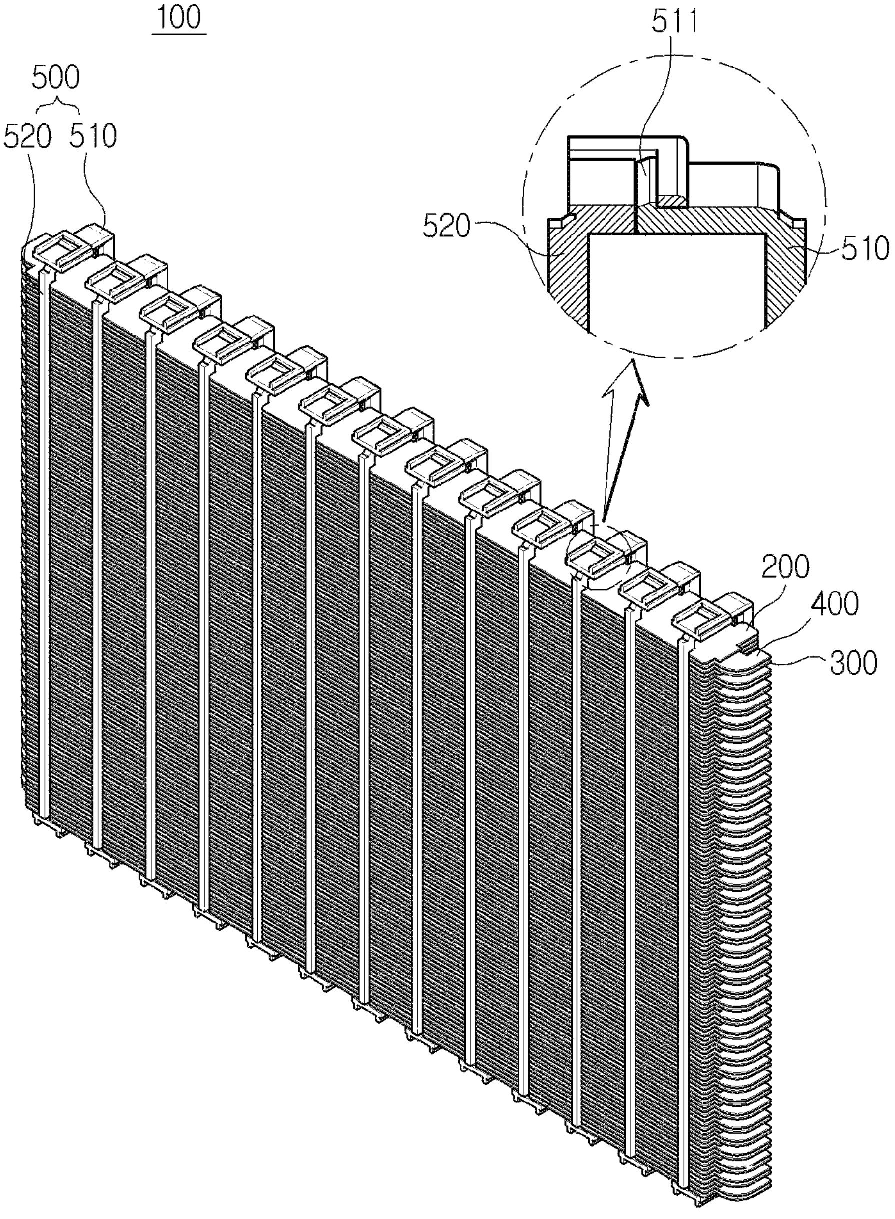

[FIG. 4]
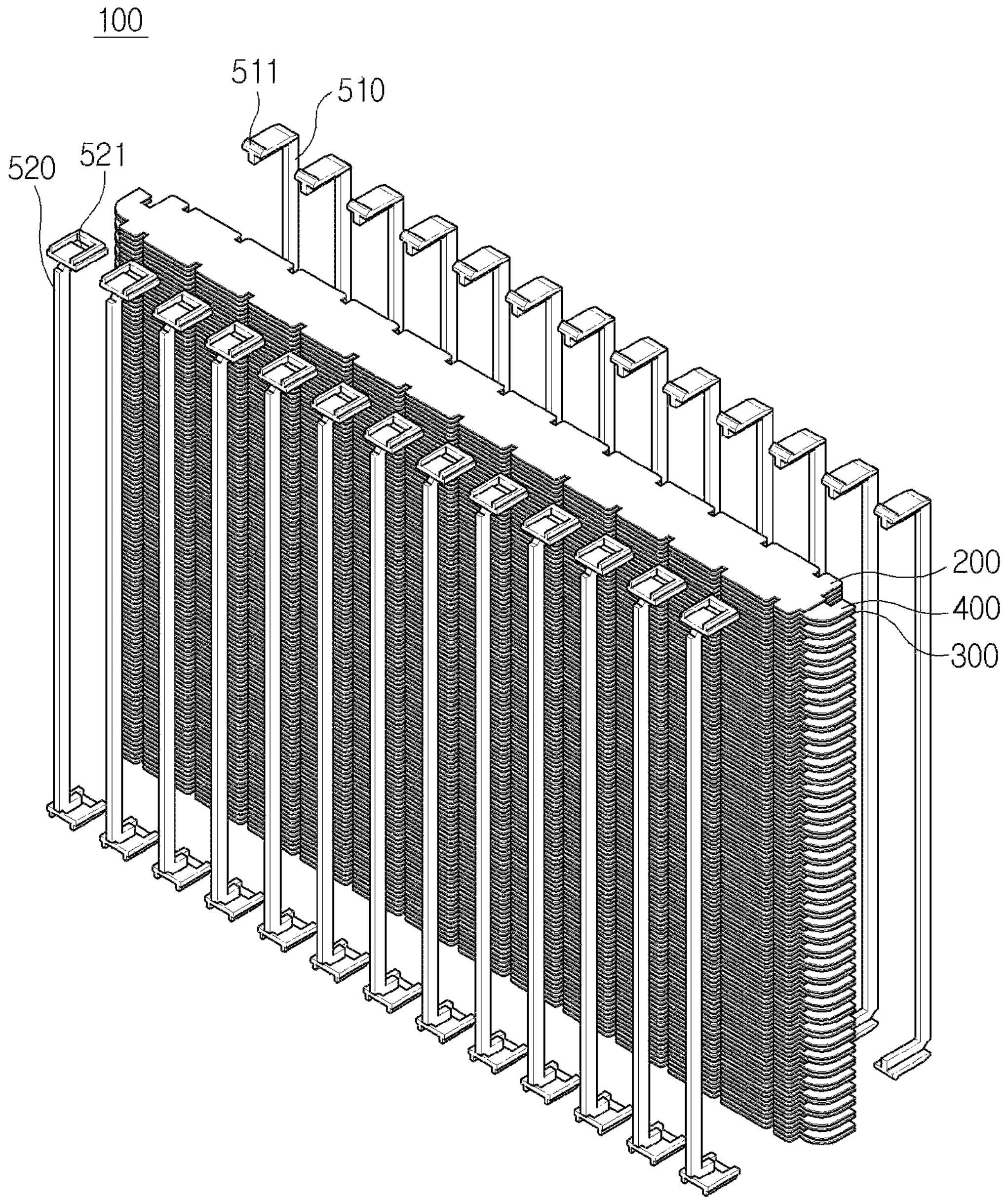

[FIG. 5]
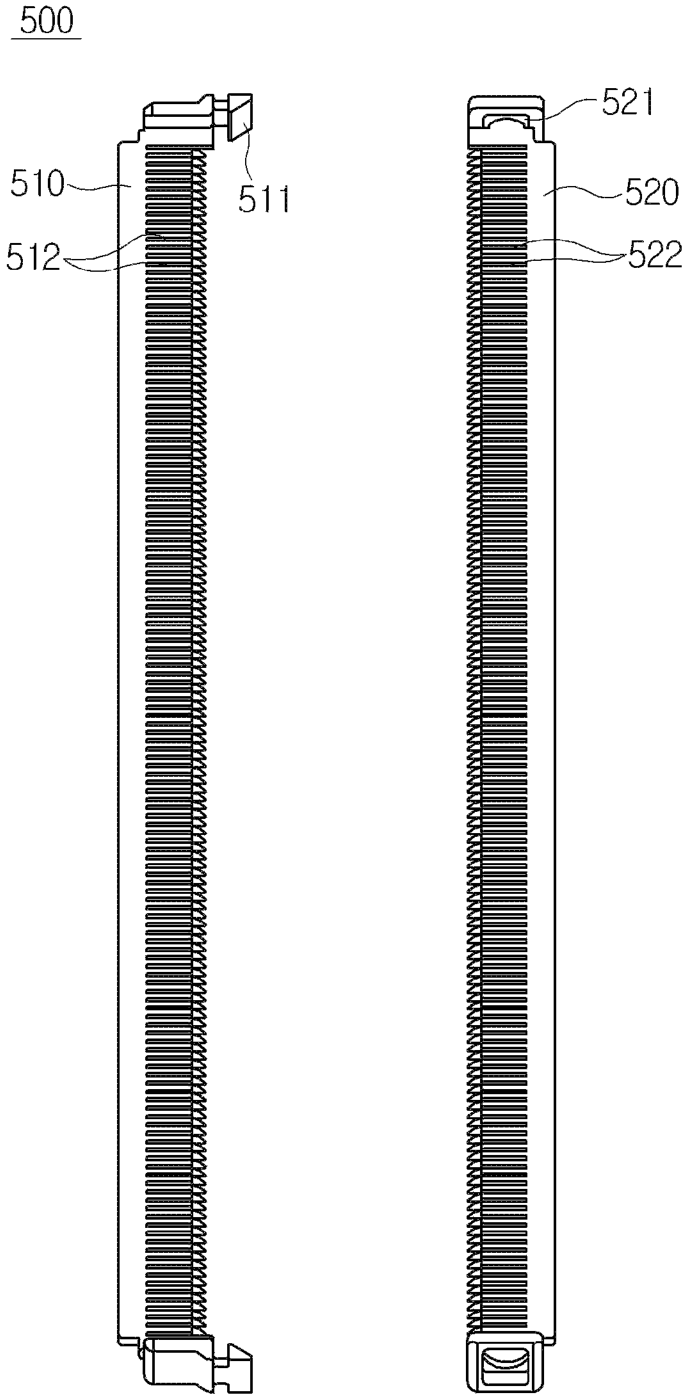

[FIG. 6]
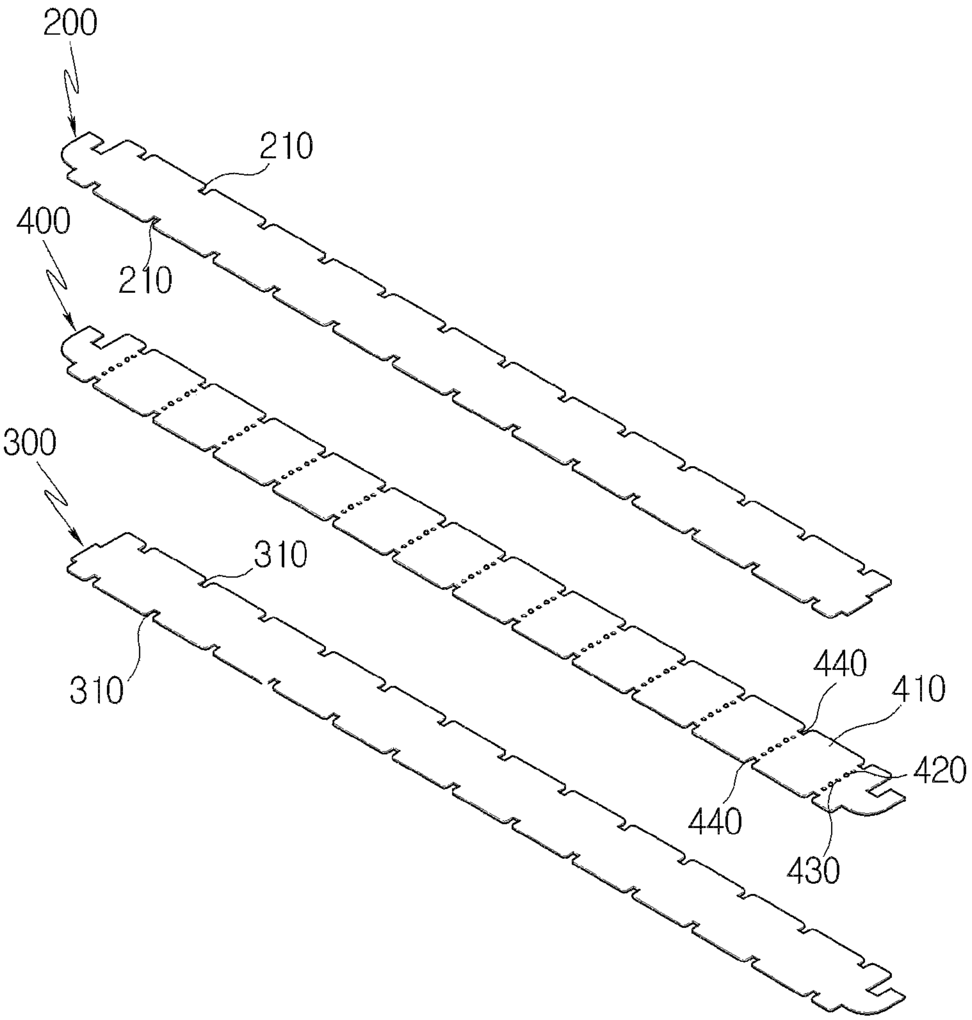

[FIG. 7a]
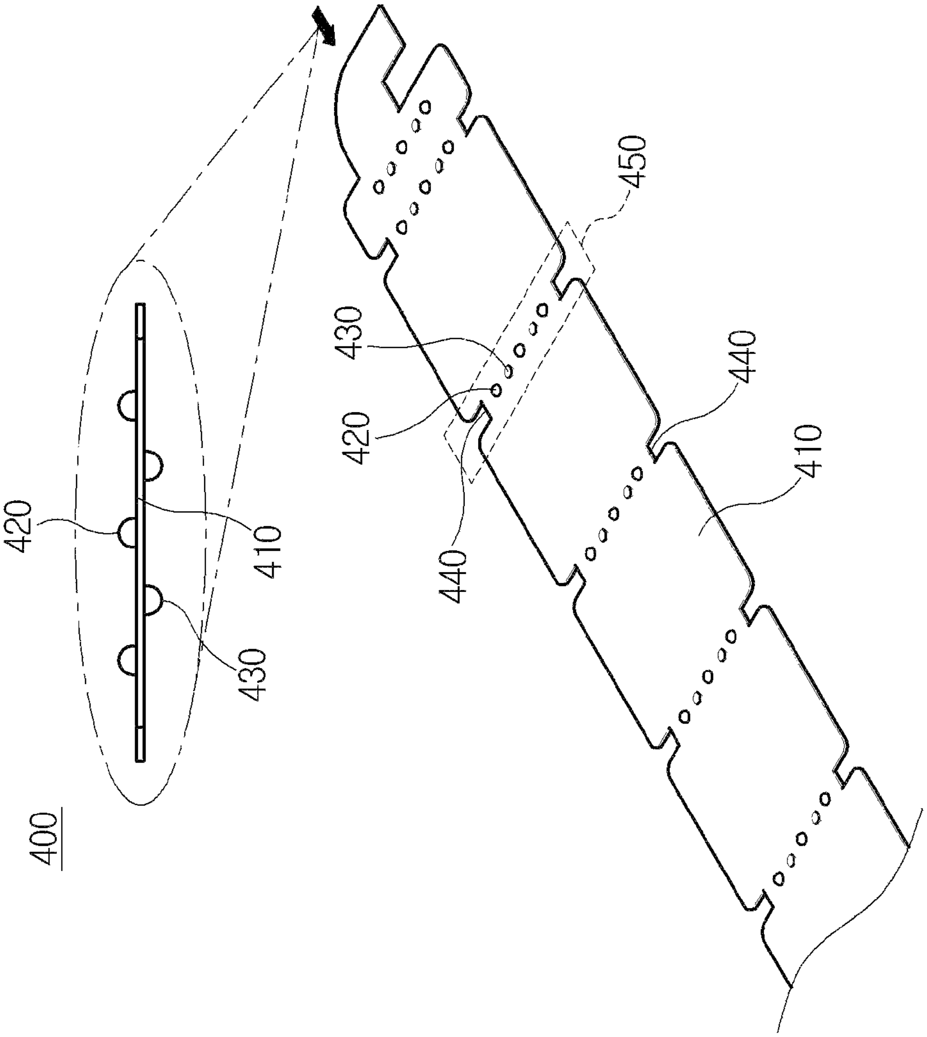

[FIG. 7b]
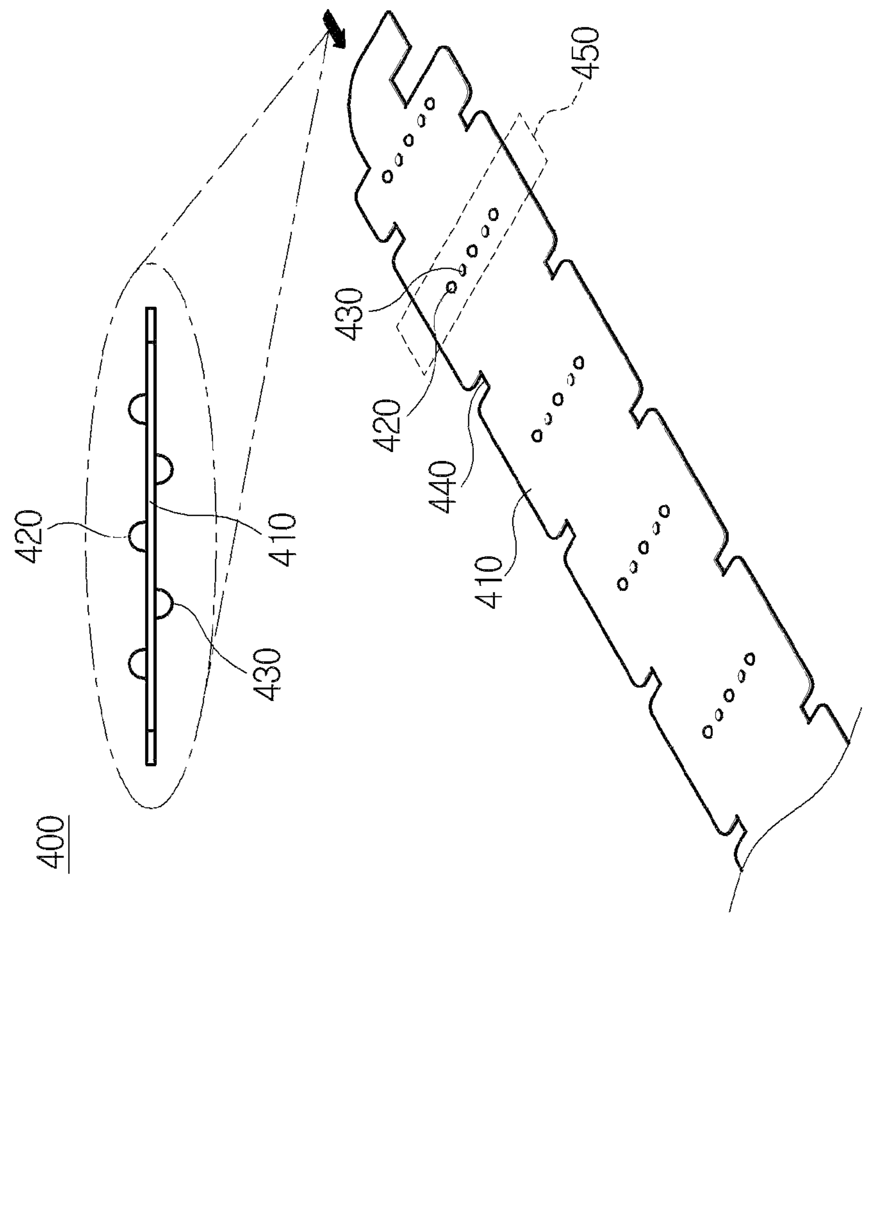

[FIG. 7c]
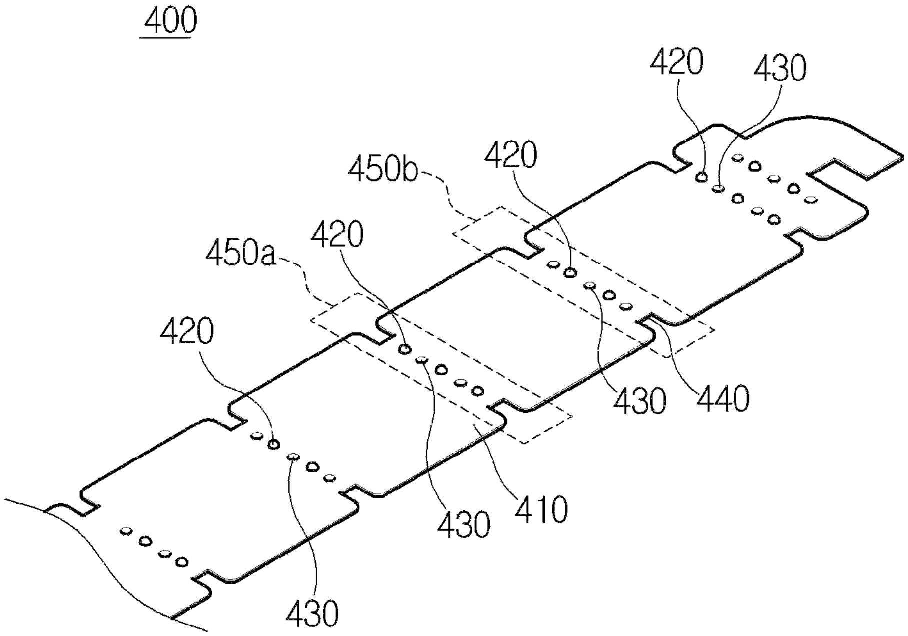

[FIG. 7d]
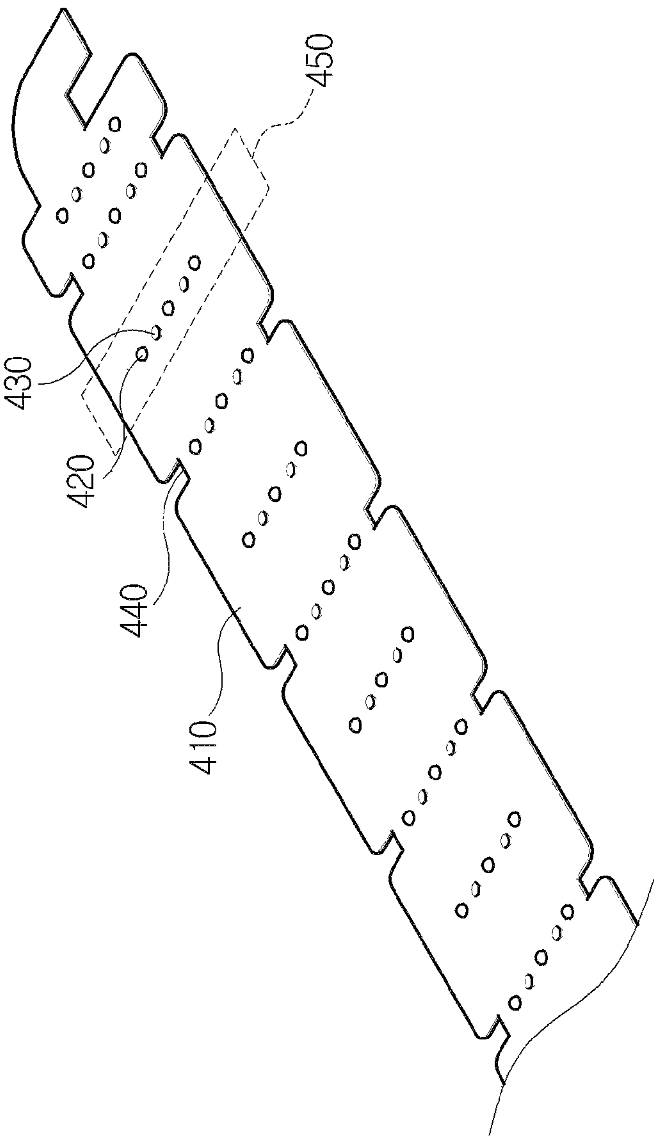

[FIG. 8]
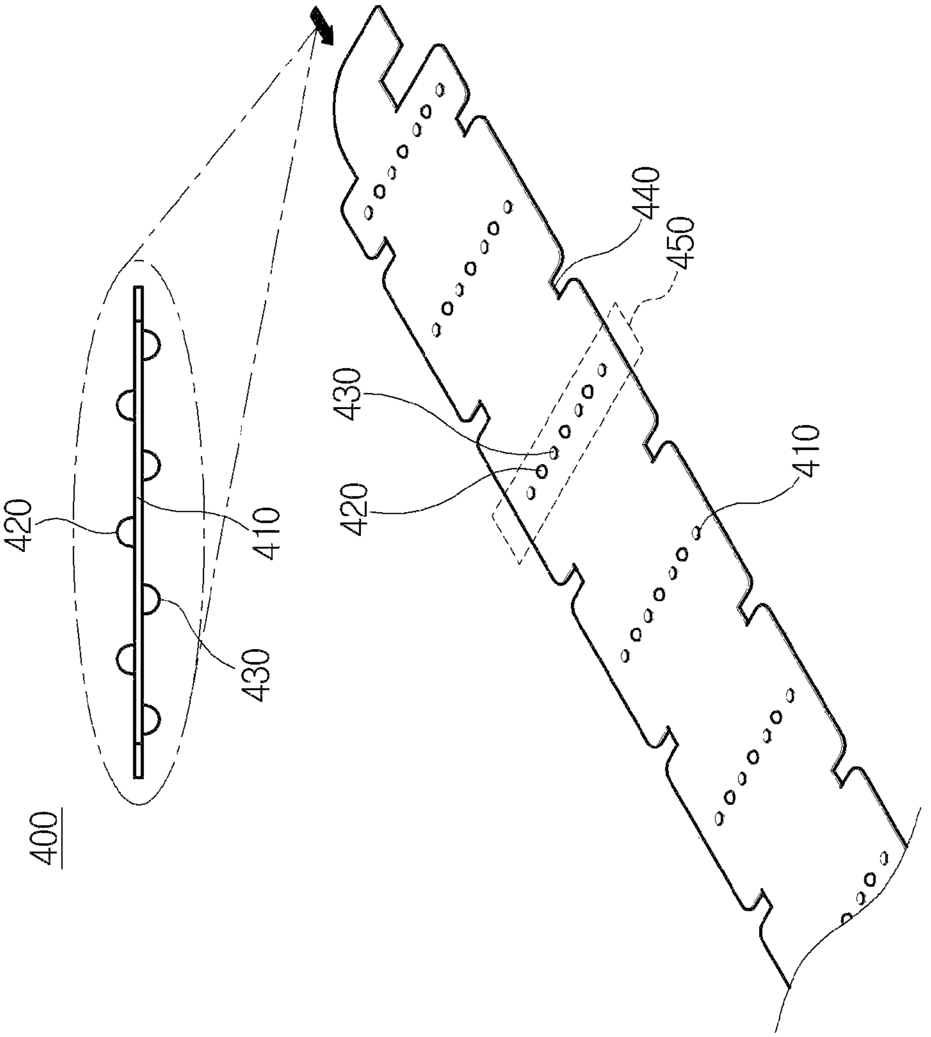

[FIG. 9]
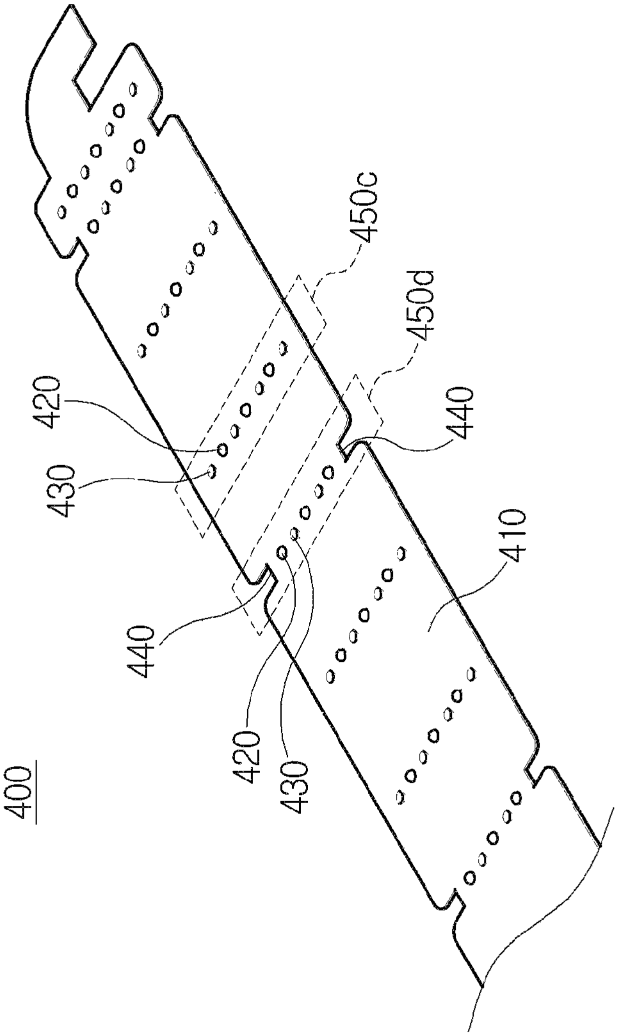

[FIG. 10]
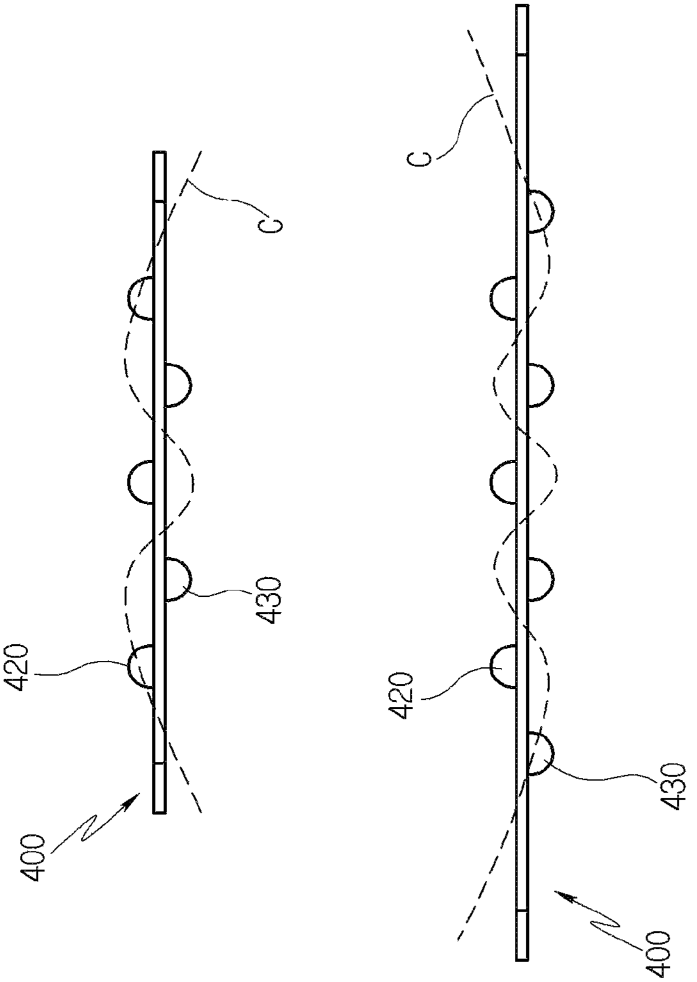

[FIG. 11]
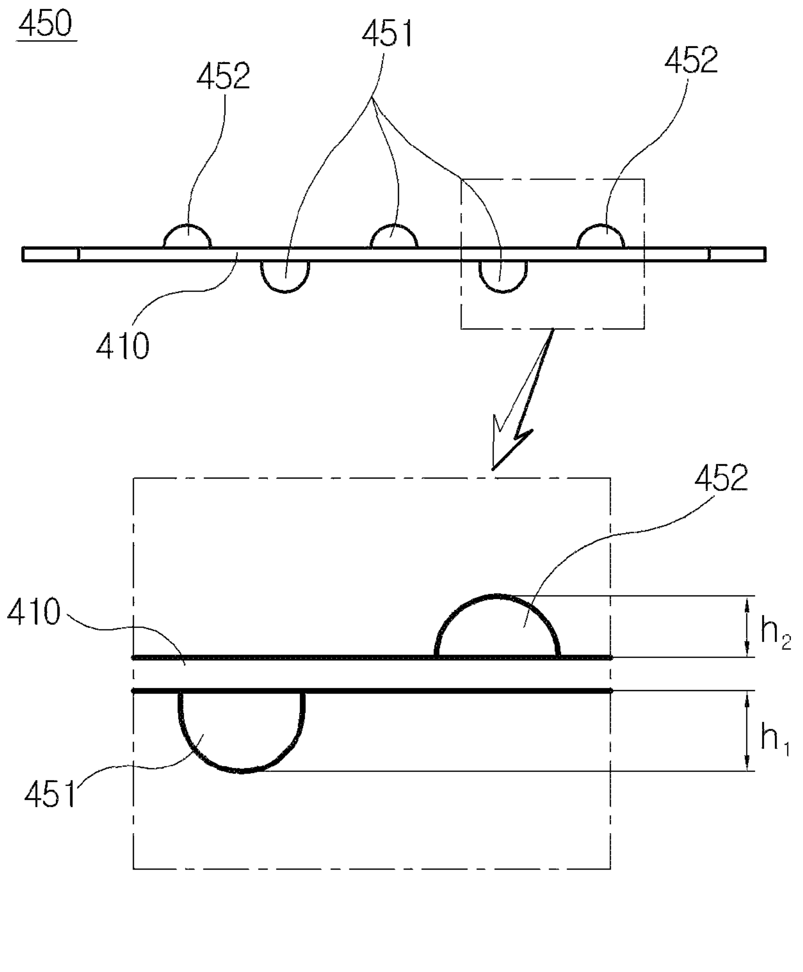

[FIG. 12]
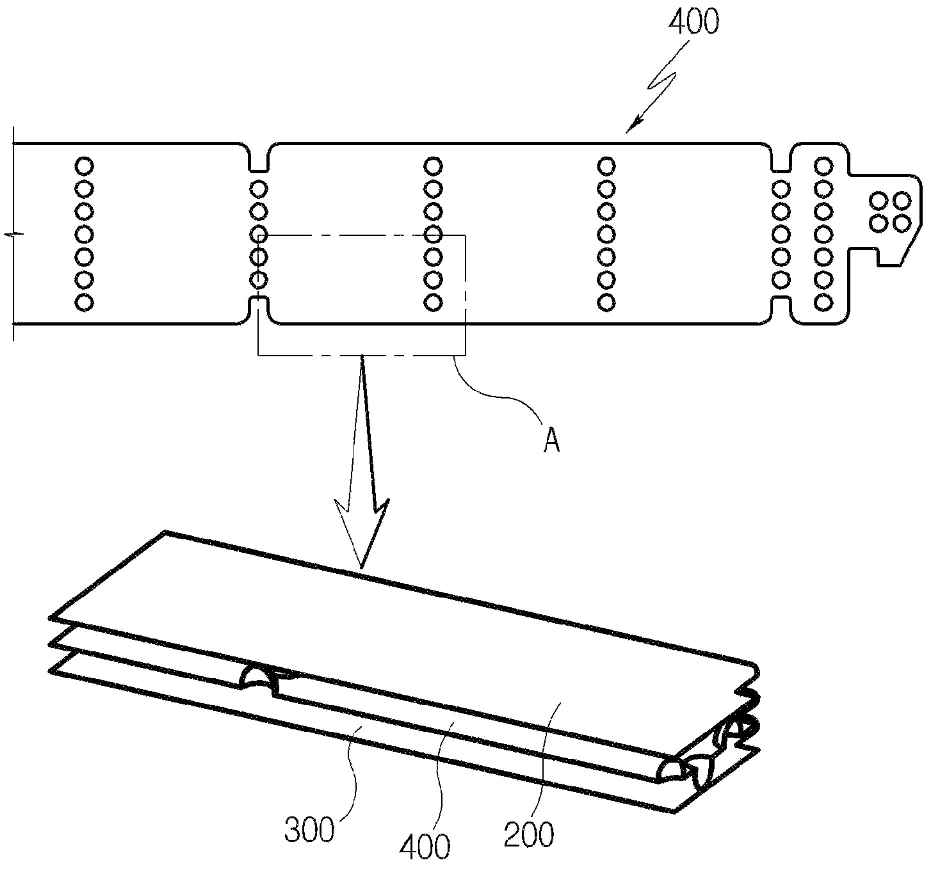

[FIG. 13]
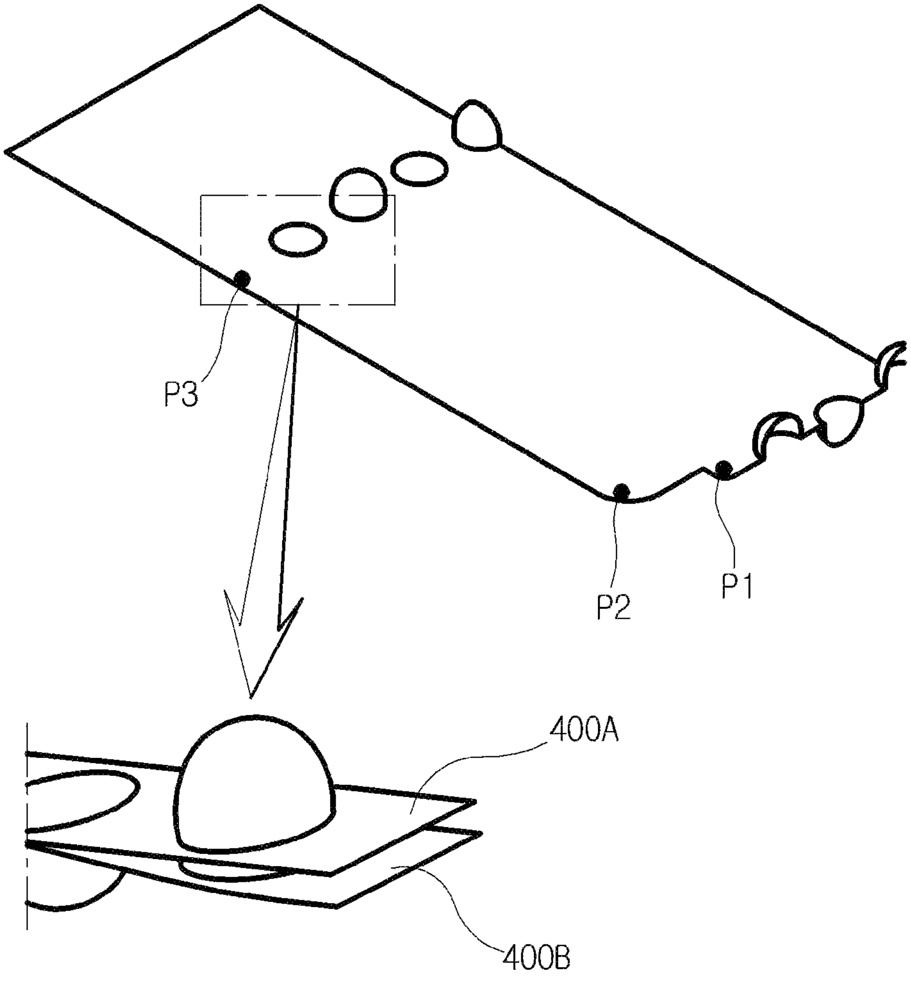

[FIG. 14a]
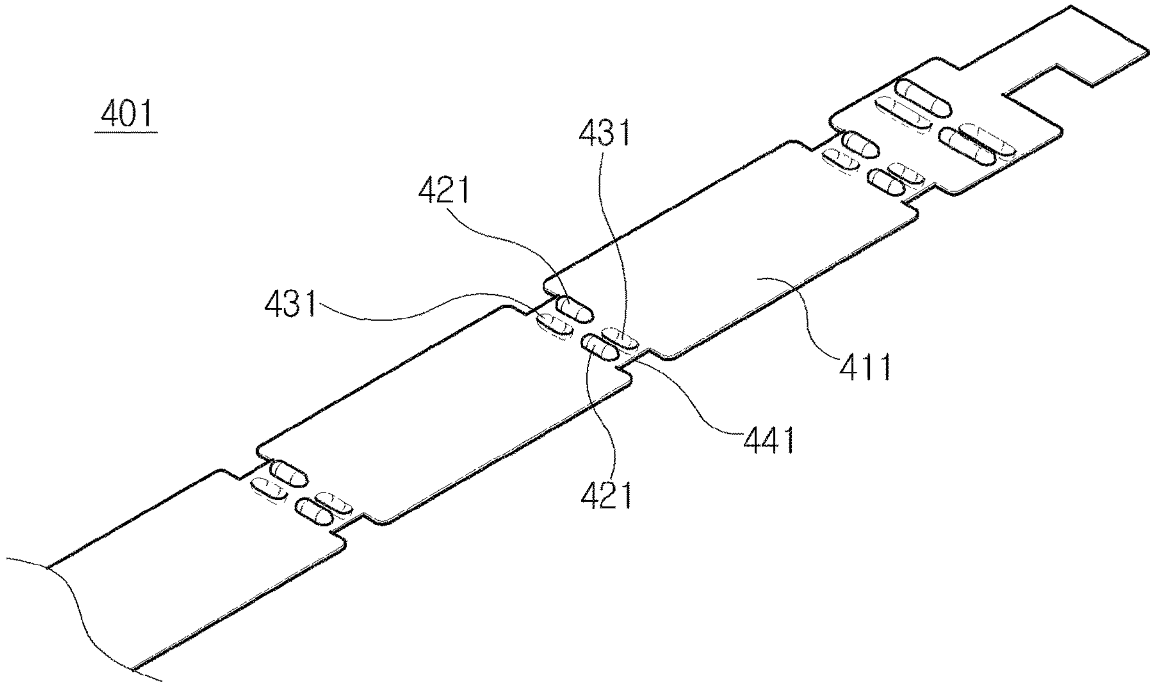

[FIG. 14b]
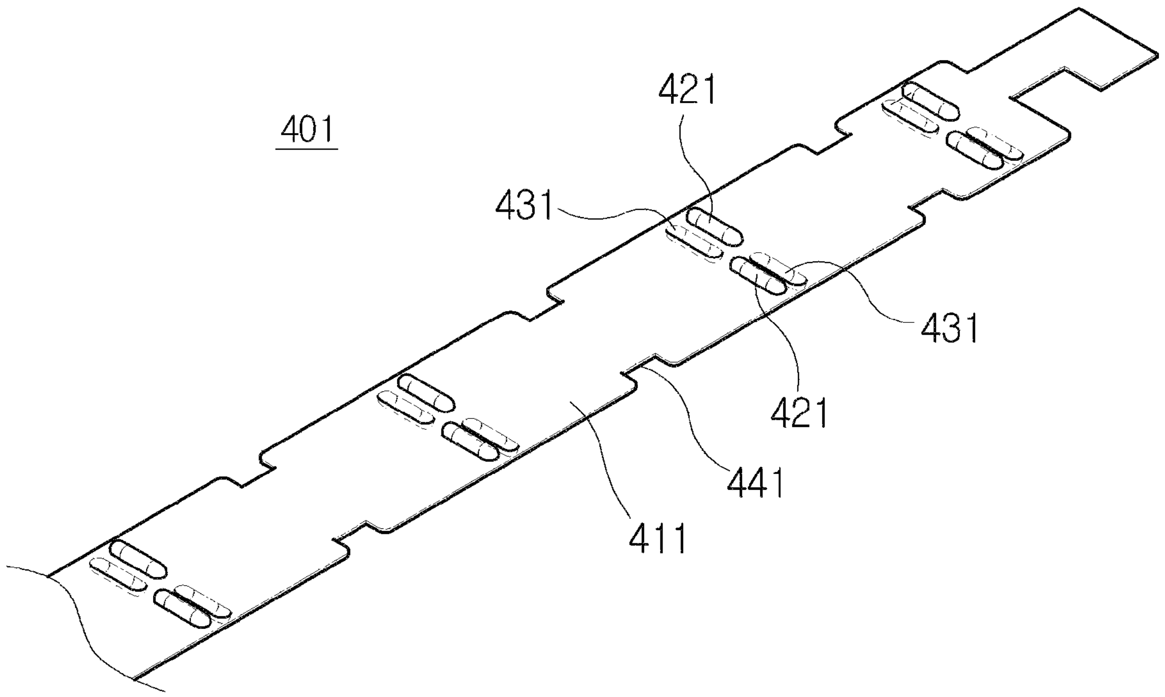

[FIG. 15]
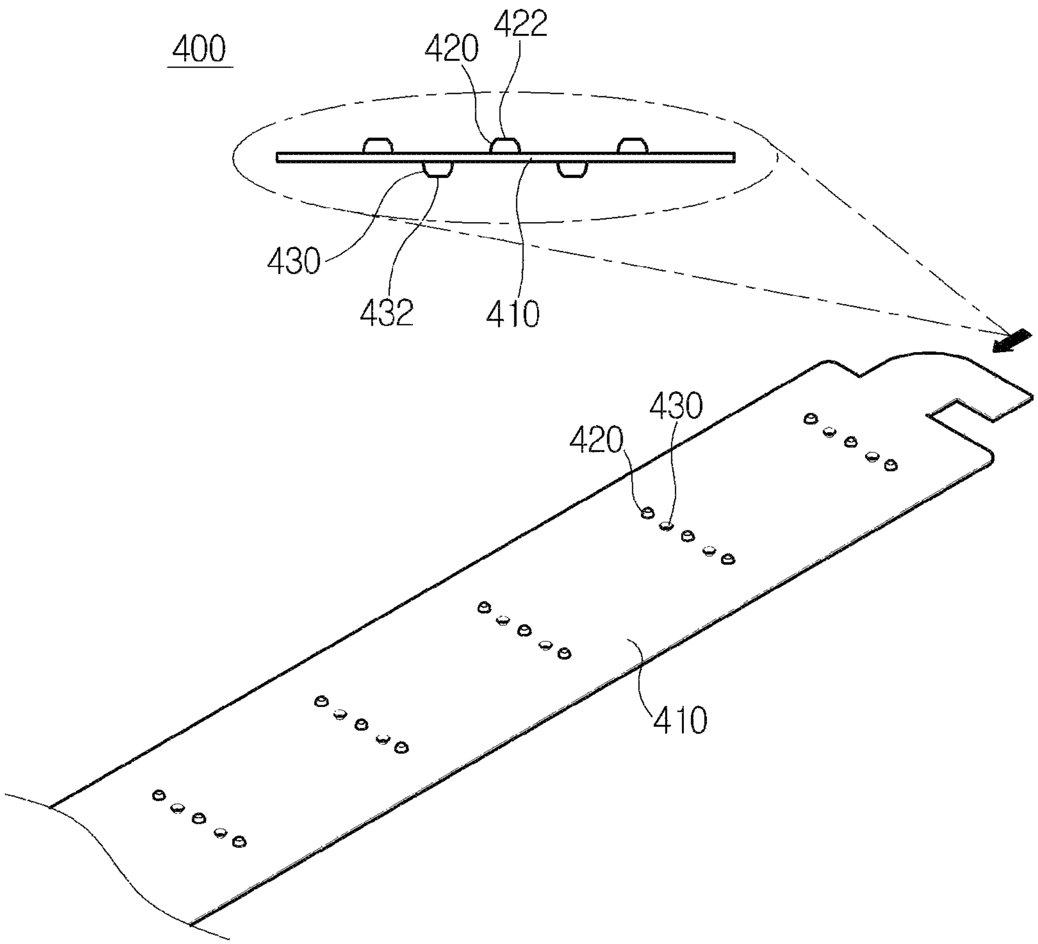

[FIG. 16]
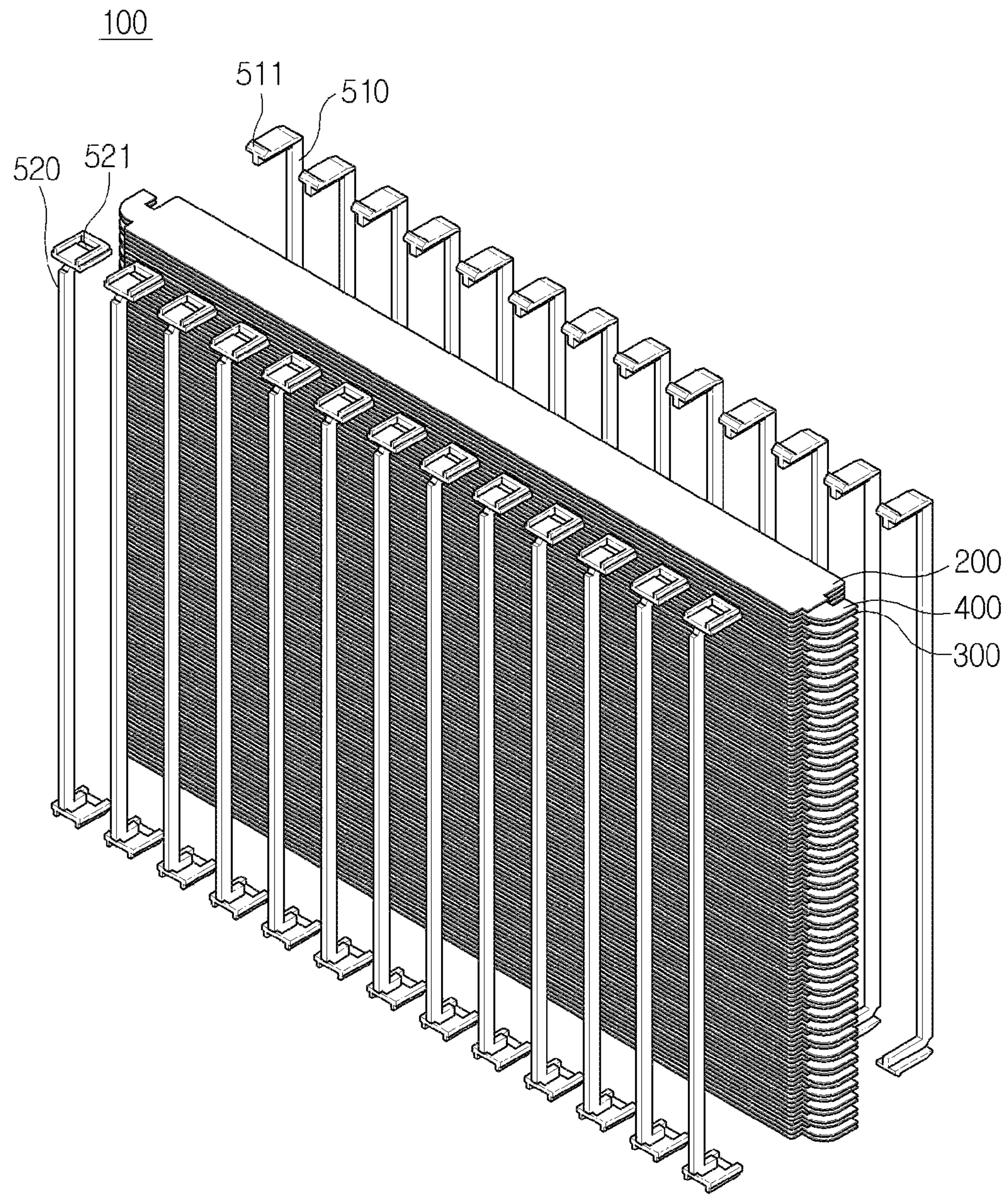

[FIG. 17]
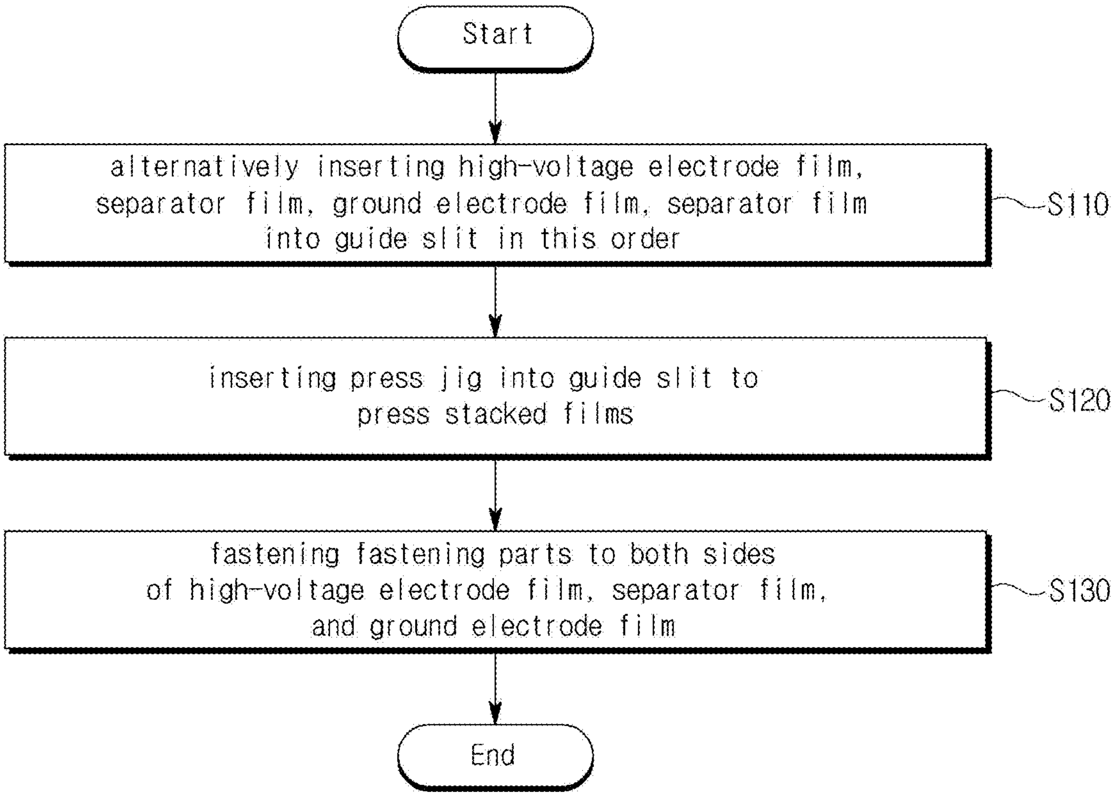

[FIG. 18a]
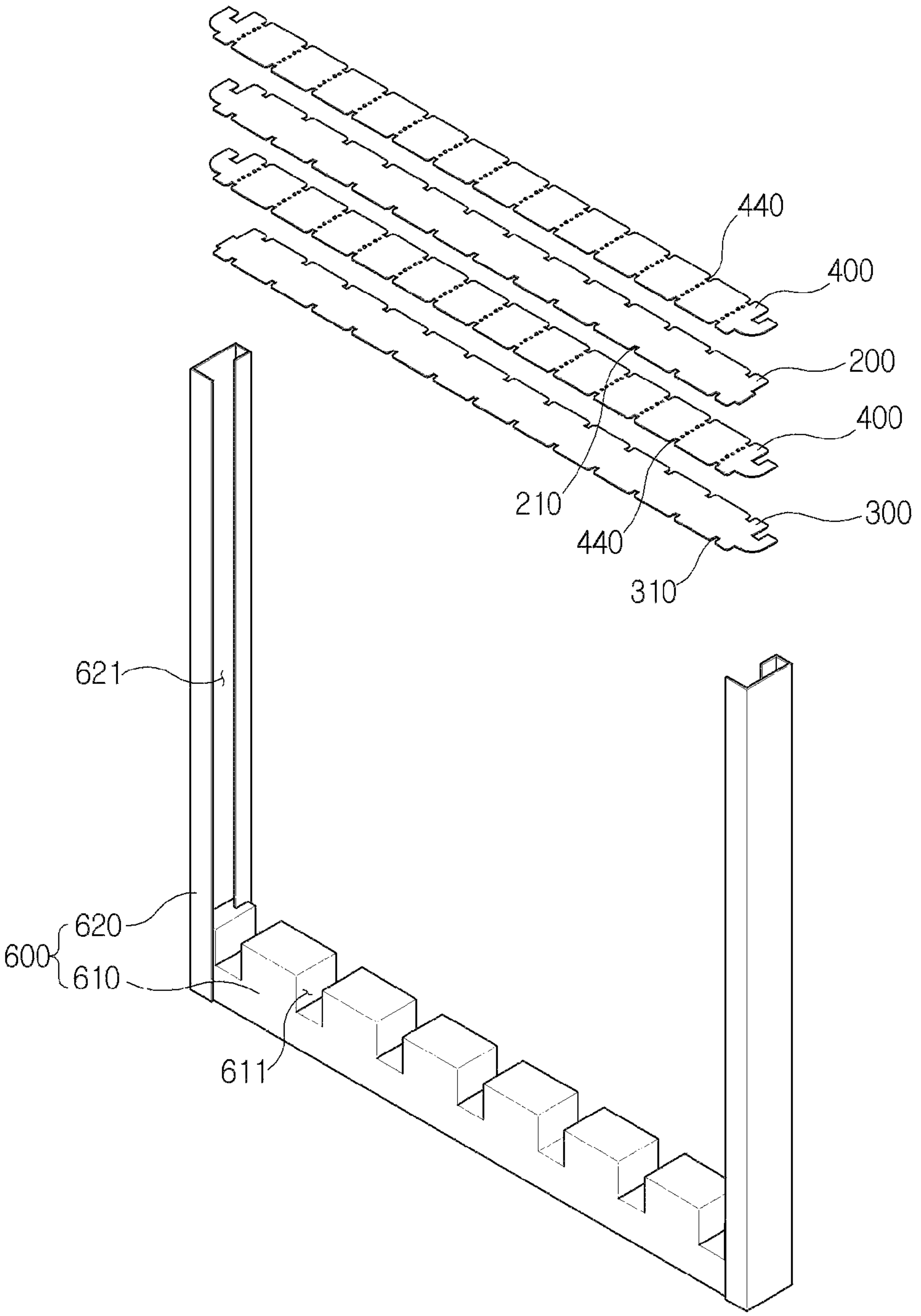

[FIG. 18b]
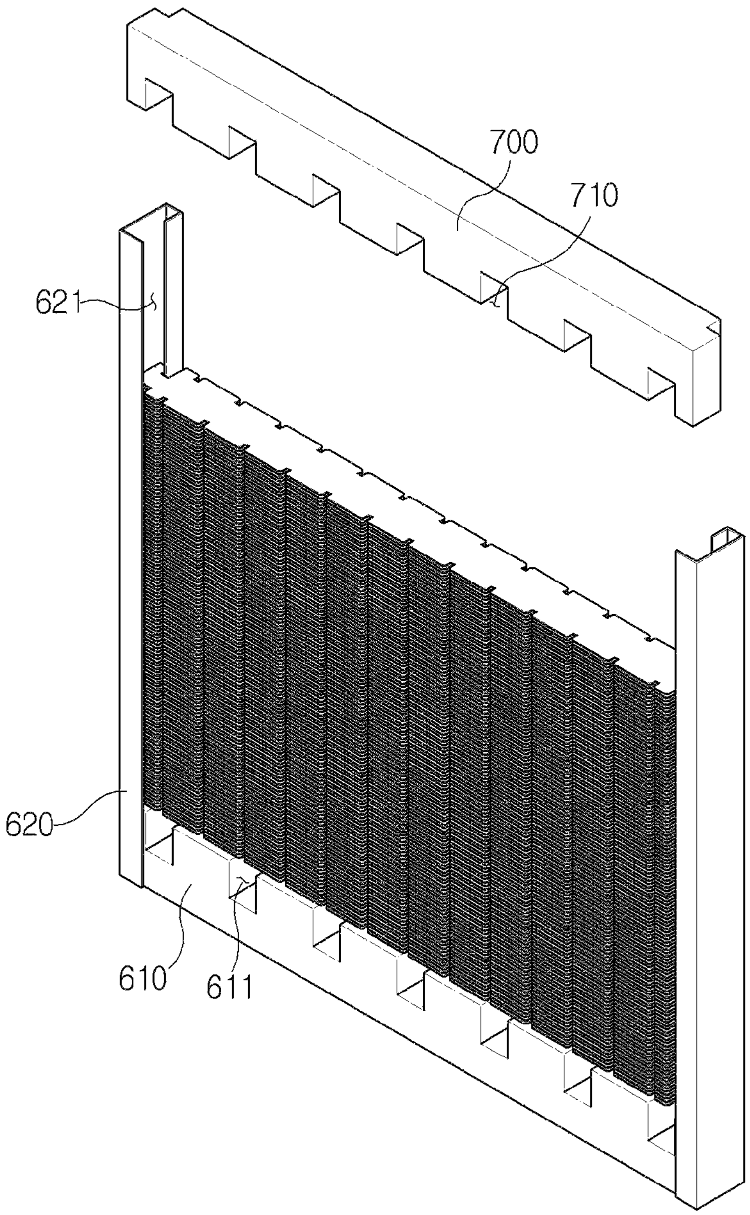

[FIG. 18c]
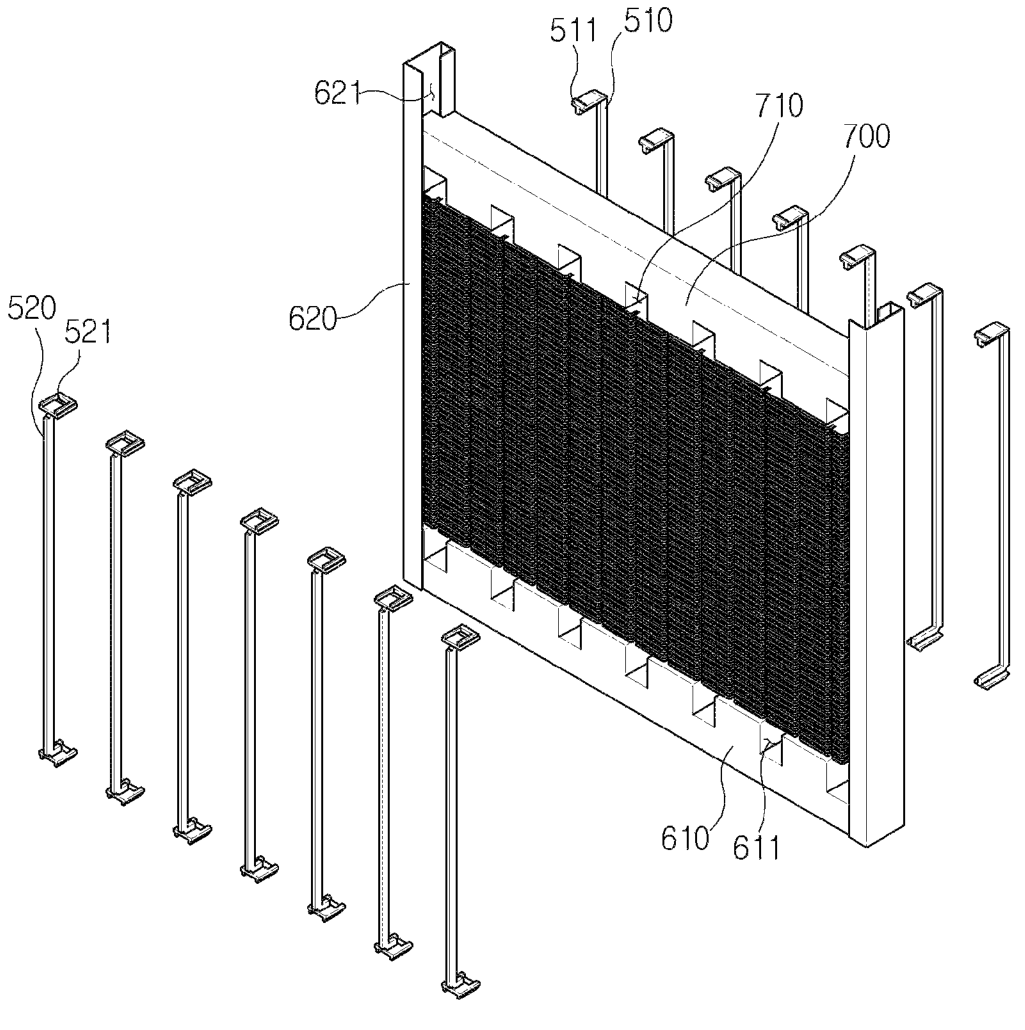

[FIG. 18d]
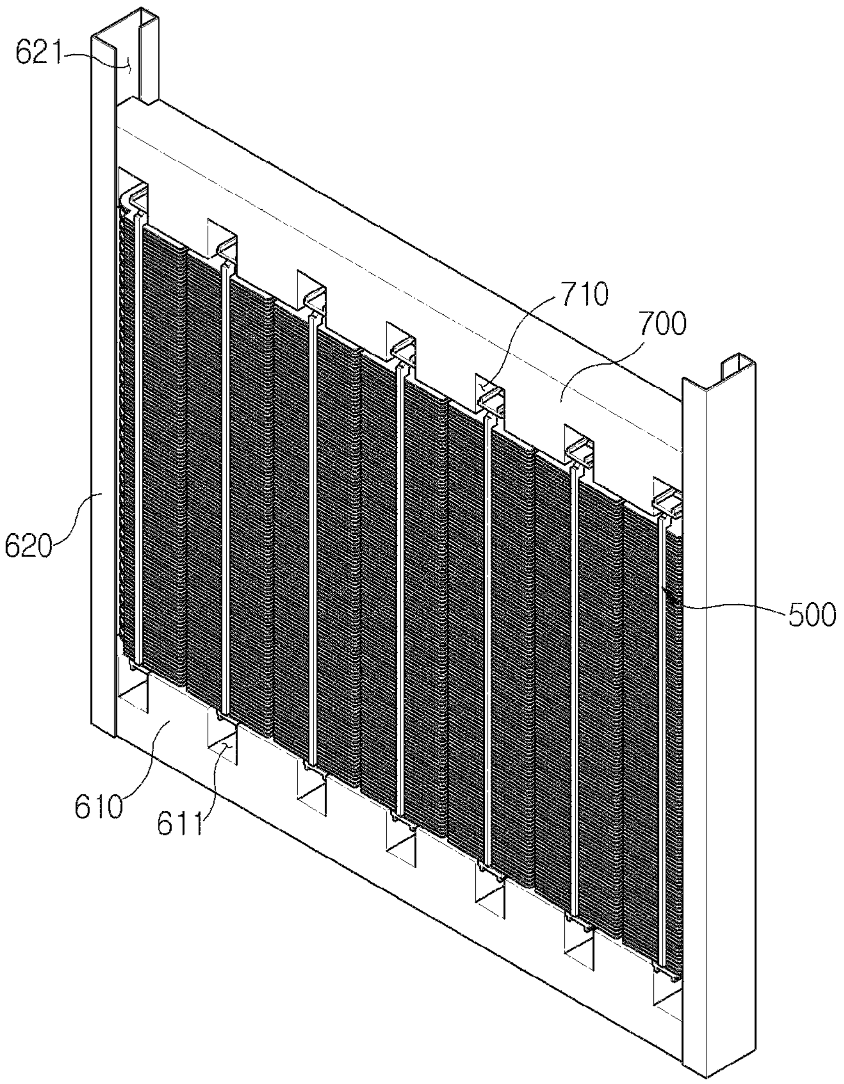

[FIG. 18e]
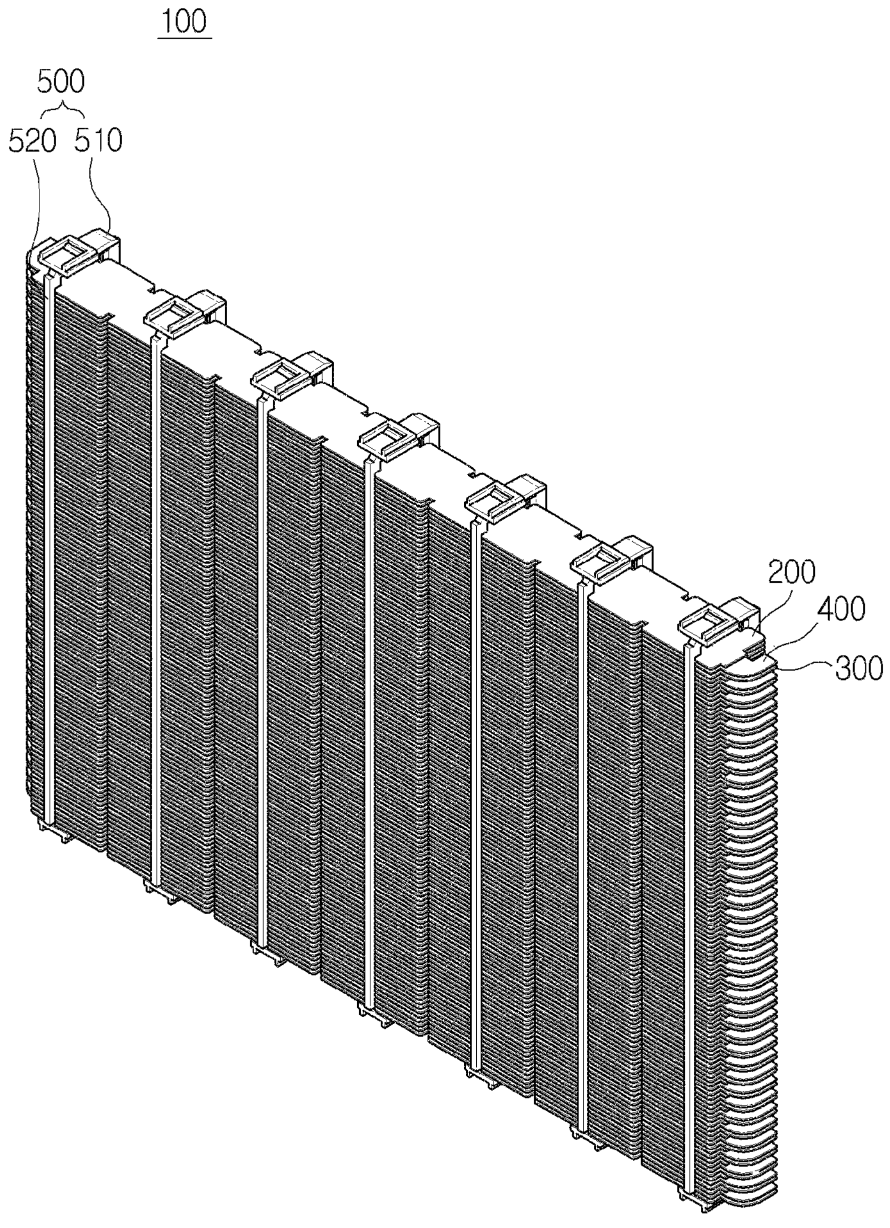

[FIG. 19a]
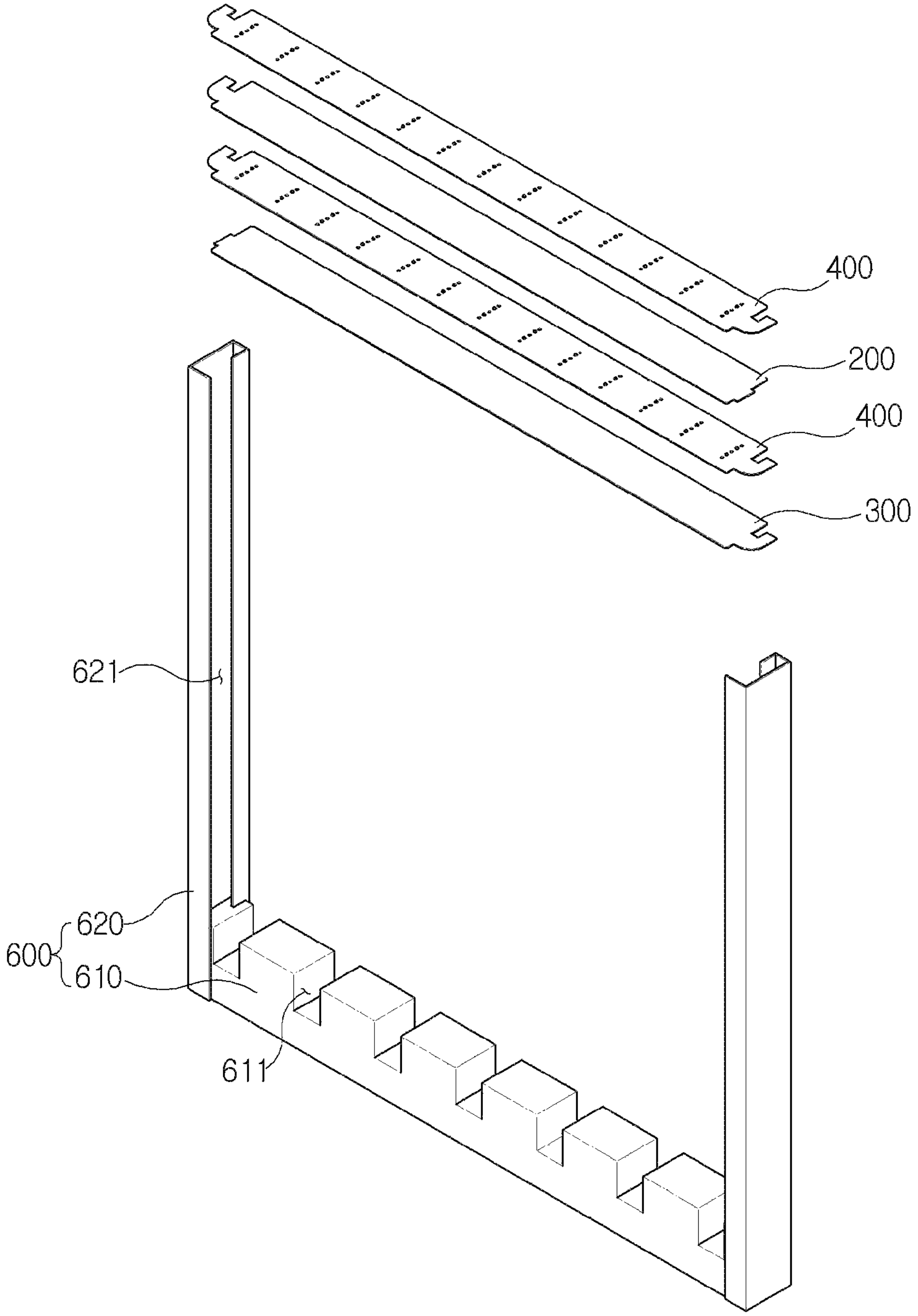

[FIG. 19b]
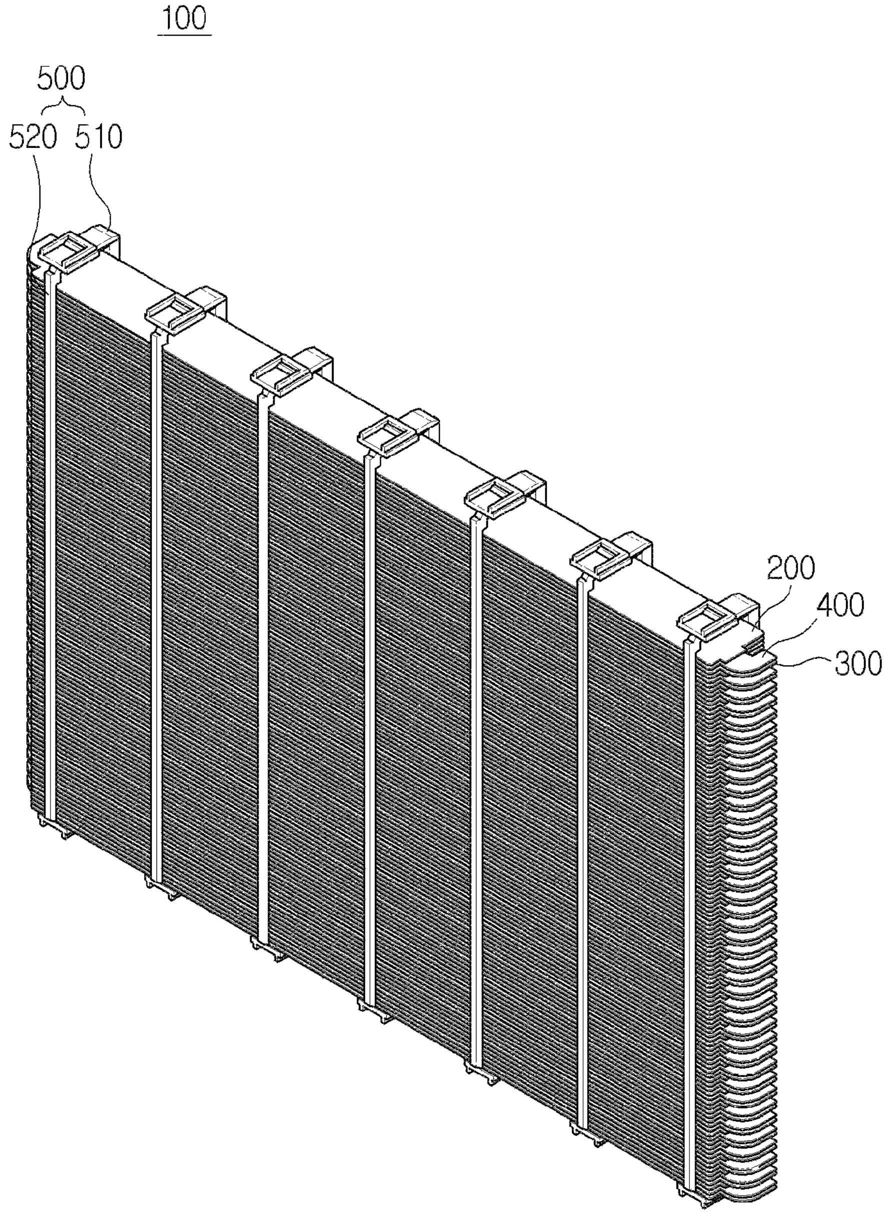

AIR CONDITIONER

CROSS-REFERENCE TO RELATED PATENT APPLICATIONS

This application is a U.S. National Stage Application under 35 U.S.C. § 371 of PCT Application No. PCT/KR2020/016756, filed Nov. 25, 2020, which claims priority to Korean Patent Application Nos. 10-2019-0151858, filed Nov. 25, 2019 and 10-2020-0005106, filed Jan. 15, 2020, whose entire disclosures are hereby incorporated by reference.

TECHNICAL FIELD

The present invention relates to an air conditioner, and more particularly, to an air conditioner including a dust collecting filter assembly whose manufacturing process can be simplified and having an improved dust collection performance.

BACKGROUND ART

In general, an air conditioner is a device for lowering an indoor temperature or maintaining a comfortable state. Such an air conditioner is provided with an electric dust collector for filtering floating substances contained in the air.

The electric dust collector is a device that removes or collects particles of a solid or liquid suspended in a gas or liquid by an electrical method.

The electric dust collector uses the principle that the electric charges generated by corona discharge are attached to particles and become charged particles, which are attracted and moved to electrodes of opposite polarity by electrostatic force.

The electric dust collector includes a discharge unit (ionization unit) and a dust collecting unit.

The discharge unit includes a discharge electrode to which a high voltage is applied and a ground electrode which is grounded, and e+ or e− generated through the corona discharge generated when a high voltage is applied to the discharge electrode charges the foreign substances in the air.

In addition, the dust collecting unit includes a plurality of dust collecting plates charged with positive (+) and minus (−) polarities, and catches and collects the fine dust charged in the ionization unit through the dust collecting plate.

In the electric dust collector, the discharge unit is installed before the dust collecting unit in an air flow direction, and the foreign substances in the air are ionized while passing through the discharge unit and then collected while passing through the dust collecting unit.

The dust collecting unit is disposed by spacing a plurality of dielectric films at a regular interval.

FIG. 1 is a view schematically showing a method of manufacturing a conventional dust collecting unit.

Referring to FIG. 1, in the conventional dust collecting part 10, a plurality of fastening parts 12 is formed to protrude along the longitudinal direction on the inside of a casing 11, and fastening grooves 13 are formed to insert and fasten dielectric films 14 to the fastening parts 12. In addition, the fastening grooves 13 are formed to be spaced apart from each other by a predetermined interval to maintain the distance between the dielectric films 14.

However, the conventional dust collecting unit 10 is manufactured by manually inserting the dielectric films 14 into the fastening grooves 13 formed in the fastening units 12 by an operator, so there is a problem that the work process is inconvenient and takes a lot of work time.

In addition, since the fastening parts 12 and the fastening grooves 13 are molded through an injection process, the minimum distance between the dielectric films 14 that can be obtained through the injection process is 2 mm. Thus, even if the dust collection performance is improved when the distance between the dielectric films 14 is less than 2 mm, there is a problem that the distance between the dielectric films 14 cannot be reduced to less than 2 mm due to the molding limit.

Japanese Patent Registration No. 4915073 (hereinafter referred to as Patent Document 1') discloses a dust collecting apparatus and an air conditioning apparatus. Patent Document 1 discloses that the distance between the dielectric films is maintained by forming protrusions on the dielectric film itself, rather than a configuration in which the distance between the dielectric films is maintained by inserting and fastening the dielectric film into an injection molded product.

However, when the protrusions are formed on the dielectric film itself as in Patent Document 1, the process for forming the protrusions on the dielectric film is very difficult, and for this purpose, there is a problem that the manufacturing cost is somewhat required. In addition, there is a risk that the formation of projections on the dielectric film may adversely affect the dust collection performance.

DISCLOSURE

Technical Problem

The present invention was devised to solve the above problems, and an object of the present invention is to provide an air conditioner equipped with a dust collecting filter assembly in which a separator film is stacked between dielectric films so that the distance between the dielectric films is uniformly spaced apart, and which can be manufactured with simplified process through simple stacking of the films.

Technical Solution

In order to achieve the above object, an air conditioner according to a preferable embodiment of the present invention includes a main body provided with an inlet and an outlet; a blower provided in the main body, sucking air through the inlet and flowing it through the outlet; and a dust collecting filter assembly provided in the main body and collecting foreign substance from the air sucked in through the inlet.

Here, the dust collecting filter assembly may include a high-voltage electrode film; a ground electrode films alternately disposed to face the high-voltage electrode film; a separator film disposed between the high-voltage electrode film and the ground electrode film so that the high-voltage electrode film and the ground electrode film are spaced apart by a predetermined interval; and a fastening part to fasten the high-voltage electrode film, the ground electrode film, and the separator film together and integrate them.

Here, in the separator film, a plurality of support protrusions protruding from both sides thereof may be configured to space the high-voltage electrode film and the ground electrode film apart from each other by the predetermined interval.

In particular, the separator film may be formed with the supporting protrusions formed in a width direction having different heights to prevent deformation in a stacked state.

More particularly, the separator film may include a base part provided in a flat plate shape; and a support part including a plurality of support protrusions whose protruding directions are alternately formed in a direction opposite to each other in a width direction of the base part, the support parts being spaced apart from each other by a predetermined distance in a longitudinal direction of the base part.

In addition, in the support part, a height of the support protrusion formed at both ends of the support part in the width direction of the base part among the plurality of support protrusions may be formed to be smaller than a height of another support protrusion.

In addition, in the support part, five or more support protrusions may be formed in an odd number in the width direction of the base part.

Further, in the support part, the height of the support protrusion formed at both ends may be formed to be 5 to 20% smaller than the height of the other support protrusion.

In addition, in the support par, a distance between the plurality of support protrusions formed in the width direction of the base part may be formed to be the same.

In addition, the support parts may be arranged alternately with each other in the longitudinal direction of the base part, or alternately arranged with each other in the width direction of the base part.

Further, the support part may be formed to protrude in a hemispherical shape so as to be in point contact with the high-voltage electrode film and the ground electrode film, respectively.

In addition, the support part may be formed to protrude in a semi-cylindrical shape so as to be in line contact with the high-voltage electrode film and the ground electrode film, respectively.

In addition, in the support part, a flat surface is formed at a protruding end so as to be in surface contact with the high-voltage electrode film and the ground electrode film, respectively.

The high-voltage electrode film, the ground electrode film, and the separator film may have fastening grooves formed on both sides thereof at a predetermined interval along a longitudinal direction so that the fastening part is inserted.

In this case, in the separator film, the fastening grooves may be formed to face in the width direction of the base part, and there may be a region in which the fastening grooves are formed and a remaining region in which the support part is formed.

In addition, in the separator film, a number of the support protrusions of the support part formed between the fastening grooves may be less than a number of the support protrusions of the support part formed in the remaining region.

The fastening part may include a first fastening member disposed on one side of a stacked high-voltage electrode film, ground electrode film, and separator film, and having both ends bent to support the film placed on an outermost side of the staked films; and a second fastening member disposed on the other side of the stacked high-voltage electrode film, ground electrode film, and separator film, having both ends bent to support the film placed on the outermost side of the staked films, and fitted and fastened to the both ends of the first fastening member.

In addition, the first fastening member may be configured to be inserted into a fastening groove formed on the one side of the stacked high-voltage electrode film, ground electrode film, and separator film, and the second fastening member may be configured to be inserted into the fastening groove formed on the other side of the stacked high-voltage electrode film, ground electrode film, and separator film.

Here, the first fastening member and the second fastening member may have a plurality of slit grooves formed along a longitudinal direction so that the high-voltage electrode film, the separator film, and the ground electrode film are respectively inserted.

Advantageous Effect

According to the air conditioner according to the present invention, by stacking the separator film between the high-voltage electrode film and the ground electrode film in the dust collecting filter assembly, the high-voltage electrode film and the ground electrode film can be supported by keeping a constant distance therebetween.

In addition, according to the present invention, the height of the support protrusion formed on the separator film to support the high-voltage electrode film is optimally designed to the height for supporting the distance between the high-voltage electrode film and the ground electrode film that can achieve the maximum dust collection performance. Accordingly, the effect of improving dust collection performance can be obtained.

In addition, according to the present invention, it is possible to obtain an effect of preventing deformation in the stacked films by forming the supporting protrusions formed at both ends of the supporting protrusions formed in the width direction of the separator film to be small in height.

Furthermore, according to the present invention, the dust collecting film assembly can be manufactured by simply stacking the films so that the separator film is disposed between the high-voltage electrode film and the ground electrode film, rather than by inserting the dielectric film into an injection product and assembling. Accordingly, the manufacturing process can be simplified, so that the effect of reducing the manufacturing cost can be obtained.

DESCRIPTION OF DRAWINGS

FIG. 1 is a perspective view schematically showing a method for manufacturing a conventional dust collecting unit.

FIG. 2 is a perspective view and a cross-sectional view schematically showing an air conditioner according to an embodiment of the present invention.

FIG. 3 is a perspective view schematically showing a dust collecting filter assembly extracted from an air conditioner according to an embodiment of the present invention.

FIG. 4 is an exploded perspective view schematically showing a dust collecting filter assembly extracted from an air conditioner according to an embodiment of the present invention.

FIG. 5 is a view schematically showing a fastening part extracted from a dust collecting filter assembly of an air conditioner according to an embodiment of the present invention.

FIG. 6 is a perspective view schematically showing a high-voltage electrode film, a separator film, and a ground electrode film extracted from a dust collecting filter assembly of an air conditioner according to an embodiment of the present invention.

FIGS. 7*a* to 7*d* are partial perspective views schematically showing various embodiments of a separator film extracted from a dust collecting filter assembly of an air conditioner according to an embodiment of the present invention.

FIGS. 8 and 9 are partial perspective views schematically showing another embodiment of a separator film in a dust collecting filter assembly of an air conditioner according to an embodiment of the present invention.

FIG. 10 is a cross-sectional view schematically showing a state in which a separator film is deformed in a dust collecting filter assembly of an air conditioner according to an embodiment of the present invention.

FIG. 11 is a cross-sectional view comparing the heights of the support protrusions formed in the width direction of a base part in a separator film of a dust collecting filter assembly of an air conditioner according to the embodiment of the present invention.

FIG. 12 is a view schematically showing an analysis range for finite element analysis on the deformation of a separator film in a dust collecting filter assembly of an air conditioner according to an embodiment of the present invention.

FIG. 13 is a view schematically showing a measurement point of an amount of deformation and a deformation state through finite element analysis of a separator film in a dust collecting filter assembly of an air conditioner according to an embodiment of the present invention.

FIGS. 14*a* and 14*b* are partial perspective views schematically showing another embodiment of a support part formed on a separator film in a dust collecting filter assembly of an air conditioner according to an embodiment of the present invention.

FIG. 15 is a partial perspective view schematically showing another embodiment of a separator film in a dust collecting filter assembly of an air conditioner according to an embodiment of the present invention.

FIG. 16 is an exploded perspective view schematically showing a dust collecting filter assembly to which the separator film of another embodiment according to FIG. 15 is applied.

FIG. 17 is a flowchart schematically showing a method for manufacturing a dust collecting filter assembly in an air conditioner according to an embodiment of the present invention.

FIGS. 18*a* to 18*e* are views schematically showing a method for manufacturing a dust collecting filter assembly in an air conditioner according to an embodiment of the present invention.

FIGS. 19*a* and 19*b* are views schematically showing a state of assembling the dust collecting filter assembly shown in FIG. 16 using a method for manufacturing a dust collecting filter assembly in an air conditioner according to the embodiment of the present invention.

MODE FOR INVENTION

In order to help understanding of the features of the present invention, an air conditioner related to an embodiment of the present invention will be described in more detail below.

Note that in indicating reference numerals to the components of the accompanying drawings to help the understanding of the embodiments described below, the same components are given the same reference numerals as much as possible even though they are indicated on different drawings. In addition, in describing the present invention, if it is determined that a detailed description of a related known configuration or function may obscure the gist of the present invention, the detailed description thereof will be omitted.

Hereinafter, specific embodiments of the present invention will be described with reference to the accompanying drawings.

FIG. 2 is a perspective view and a cross-sectional view schematically showing an air conditioner according to an embodiment of the present invention.

Referring to FIG. 2, an air conditioner 20 according to an embodiment of the present invention includes a main body 21 provided with an inlet 22 and an outlet 23, a blower 24 provided in the main body 21 to suck air through the inlet 22 and flow it to the outlet 23, and a dust collecting filter assembly 100 provided in the main body 21 to collect foreign substance from the air sucked in through the inlet 22.

With this configuration, when the blower 24 operates and forced flow of air occurs, the air introduced into the inlet 22 passes through the dust collecting filter assembly 100, and the foreign substances contained in the air are collected and purified. The purified air is discharged back into a room through the outlet 23.

In FIG. 2, the dust collecting filter assembly 100 is disposed between the inlet 22 and the blower 24, but the present invention is not limited thereto, and the dust collecting filter assembly 100 may also be placed between the outlet 23 and the blower 24. That is, the position of the dust collecting filter assembly 100 may be changed according to the shape of the main body 21, the positions of the inlet 22 and the outlet 23, or an air flow path.

The air conditioner is a well-known device in which air is circulated, such as an air conditioner for cooling or heating indoor air, an air purifier for purifying indoor air, and a humidifier that includes an air purification function and controls indoor humidity by generating water vapor. That is, the air conditioner may be provided with any device provided with the dust collecting filter assembly for collecting foreign substances from the sucked air.

Hereinafter, the dust collecting filter assembly of the air conditioner according to an embodiment of the present invention will be described in more detail.

FIGS. 3 and 4 are a perspective view and an exploded perspective view schematically showing a dust collecting filter assembly extracted from an air conditioner according to an embodiment of the present invention. In addition, FIG. 5 is a view schematically showing a fastening part extracted from the dust collecting filter assembly, FIG. 6 is a perspective view schematically showing a high-voltage electrode film, a separator film, and a ground electrode film extracted from the dust collecting filter assembly, and FIGS. 7 to 9 are partial perspective views schematically showing various embodiments of the separator film.

Referring to FIGS. 3 to 9, the dust collecting filter assembly 100 according to an embodiment of the present invention includes a high-voltage electrode film 200, a ground electrode film 300 alternately disposed to face the high-voltage electrode film 200, a separator film 400 disposed between the high-voltage electrode film 200 and the ground electrode film 300, and a fastening part 500 for fastening the stacked films together and integrating them.

The high-voltage electrode film 200 is provided as a flat-panel film whose surface is covered with a film of an insulating material. Here, as the insulating material coated on the surface of the high-voltage electrode film 200, polyethylene (PE), polyethylene terephthalate (PET), polytetrafluoroethylene (PTFE), and the like may be used.

The ground electrode film 300 is alternately disposed to face the high-voltage electrode film 200. In addition, the ground electrode film 300 is grounded (GND).

When a high voltage of direct current (DC) is applied between the high-voltage electrode film 200 and the ground electrode film 300 by a high-voltage generating circuit (not shown), the floating particles charged by a charging unit (not shown) are attached to the surface of the ground electrode film 300 by static electricity, so that the floating particles can be collected.

The separator film 400 is disposed between the high-voltage electrode film 200 and the ground electrode film 300 to space the high-voltage electrode film 200 and the ground electrode film 300 apart at a predetermined interval.

In the dust collecting filter assembly 100 of the present invention, in order to space the high-voltage electrode film 200 and the ground electrode film 300 apart, the separator film 400 is disposed between the high-voltage electrode film 200 and the ending ground electrode film 300.

Through this, the manufacturing process can be simplified, and a dust collecting area can be improved to improve the dust collection performance.

More specifically, in the conventional dust collecting unit 10 shown in FIG. 1, the conventional dust collecting unit 10 is manufactured by directly inserting the dielectric films 14 into the fastening grooves 13 of the fastening parts 12 formed in the casing 11 made of injection molding, so it takes a lot of manufacturing time.

In comparison with this, the dust collecting filter assembly 100 of the present invention can be manufactured by stacking films in the order of the high-voltage electrode film 200, the separator film 400, the ground electrode film 300, and the separator film 400. Therefore, compared to the conventional method, manufacturing time can be significantly reduced. A more specific manufacturing process will be described in detail below in the method for manufacturing the dust collecting filter assembly of the present invention.

In addition, in the conventional dust collecting unit 10, the fastening parts 12 are molded through an injection process, and the minimum distance between the fastening grooves 13 that can be achieved through the injection process is 2 mm. Therefore, in the conventional dust collecting unit 10, the minimum distance between the dielectric films 14 is 2 mm.

In comparison with this, in the dust collecting filter assembly 100 of the present invention, the separator film 400 is disposed between the high-voltage electrode film 200 and the ground electrode film 300 so that the distance between the high-voltage electrode film 200 and the ground electrode films 300 may be adjusted.

First, since the separator film 400 is separately manufactured and disposed, the protrusion heights of the first support protrusion 420 and the second support protrusion 430 for supporting the high-voltage electrode film 200 and the ground electrode film 300 in the separator film 400 can be manufactured to be less than 1 mm, respectively, the distance between the high-voltage electrode film 200 and the ground electrode film 300 can be 2 mm or less. Therefore, the minimum distance that could not be achieved in the conventional art can be achieved, and the distance between the high-voltage electrode film 200 and the ground electrode film 300 can be set at a distance that can exhibit the optimal dust collection performance. Here, even in consideration of the thickness of the separator film 400 and the manufacturing process, the distance between the high-voltage electrode film 200 and the ground electrode film 300 may be narrowed down to at least 0.5 mm.

In addition, by manufacturing the protrusion heights of the first support protrusion 420 and the second support protrusion 430 to be 1 mm, respectively, the distance between the high-voltage electrode film 200 and the ground electrode film 300 may be 2 mm as in the conventional art. Even in this case, the separator film 400 performs a dust collecting function together with the ground electrode film 300. That is, since both sides of the separator film 400 are provided as a dust collecting area, the dust collection performance can be improved as compared to the conventional dust collecting unit 10.

The fastening part 500 fastens the high-voltage electrode film 200, the ground electrode film 300, and the separator film 400 together and integrates them. That is, the fastening part 500 is provided so that the high-voltage electrode film 200, the ground electrode film 300, and the separator film 400 are fastened to maintain a stacked state and form an assembly.

More specifically, the fastening part 500 is provided with a first fastening member 510 and a second fastening member 520 to be inserted and fastened into the fastening grooves 210, 310, and 440 formed on both sides of the stacked high-voltage electrode film 200, ground electrode film 300, and separator film 400.

The first fastening member 510 is provided in the form of a bar, and inserted in the fastening grooves 210, 310, and 440 formed on one sides of the high-voltage electrode film 200, the ground electrode film 300, and the separator film 400. In addition, the both ends of the first fastening member in the longitudinal direction are bent to support the film disposed on the outermost side. In addition, a hook 511 is formed at both ends of the first fastening member 510 to be fastened to the second fastening member 520.

The second fastening member 520 is provided in the form of a bar, and inserted in the fastening grooves 210, 310, and 440 formed on the other sides of the high-voltage electrode film 200, ground electrode film 300, and separator film 400. In addition, the both ends of the second fastening member in the longitudinal direction are bent to support the film disposed on the outermost side.

In addition, a locking hole 521 is formed at both ends of the second fastening member 520, and the hook 511 formed in the first fastening member 510 is inserted and fastened with the locking hole 521. It will be apparent that the configuration for fastening the first fastening member 510 and the second fastening member 520 is not limited to the hook 511 and the locking hole 521, but a commonly used various fastening configuration for fastening the opposite components to each other may be applied.

Accordingly, in a state in which the high-voltage electrode film 200, the ground electrode film 300, and the separator film 400 are stacked, the first fastening member 510 and the second fastening member 520 are inserted into the fastening grooves 210, 310, 440 of the stacked films, and then, the hook 511 provided in the first fastening member 510 is inserted and fastened into the locking hole 521 provided in the second fastening member 520 to form the dust collecting filter assembly 100. In this case, the fastening part 500 may be fastened to all of the fastening grooves 210, 310, 440 of the stacked films as shown in FIG. 3, or may be fastened to only a specific fastening groove if necessary. That is, if the fastening force can be maintained by integrating the stacked films, the number of fastening parts 500 to be fastened can be minimized.

Furthermore, referring to FIG. 5, a plurality of slit grooves 512, 522 may be formed in the first fastening member 510 and the second fastening member 520 in the longitudinal direction. That is, when the slit grooves 512, 522 are formed in the first fastening member 510 and the second fastening member 520, they are inserted in the fastening grooves 210,

310, 440 of the stacked films so that when assembling, the high-voltage electrode film 200, the separator film 400, and the ground electrode film 300 may be inserted into the slit grooves 512 and 522, respectively. Through this, it is possible not only to improve the fastening force of the stacked films, but also to more effectively maintain the distance between the stacked films.

Hereinafter, the separator film 400 will be described in more detail.

The separator film 400 is provided in the form of a flat plate, and is configured to include a base part 410 having fastening grooves 440 formed on both sides thereof along the longitudinal direction, and support parts 450 composed of a plurality of support protrusions 420, 430 formed so that protruding directions are opposite to each other in the width direction of the base part 410, and spaced apart from each other by a predetermined interval in the longitudinal direction of the base part 410.

That is, the plurality of support protrusions 420, 430 is formed in a plurality of columns and rows in the base part 410, and one row provided in the width direction constitutes the support part 450. In addition, the support parts 450 are formed to be spaced apart at a predetermined interval along the longitudinal direction of the base part 410 to form a plurality of rows.

Here, the support part 450 includes the first support protrusion 420 protruding from the base part 410 in the direction of the high-voltage electrode film 200 to support the high-voltage electrode film 200, and the second support protrusion 430 protruding from the base part 410 in the direction of ground electrode film 300 to support the second electrode film 300, and the first support protrusion 420 and the second support protrusion 430 are alternately provided. In this case, the distance between the plurality of support protrusions 420 and 430 may be formed to be the same.

With this configuration, corresponding to the protruding heights of the first and second support protrusions 420, 430 respectively protruding from both sides of the separator film 400, the distance between high-voltage electrode film 200 and the ground electrode film 300 may be set. Therefore, after selecting an optimal distance between the high-voltage electrode film 200 and the ground electrode film 300 capable of exhibiting an optimal dust collection performance, the protrusion heights of the first support protrusion 420 and the second support protrusion 430 are formed to the height that can achieve the optimum distance in manufacturing the separator film 400. Here, in consideration of the thickness of the separator film 400 and the manufacturing process, the high-voltage electrode film 200 and the ground electrode film 300 are manufactured such that the distance between the high-voltage electrode film 200 and the ground electrode film 300 is disposed at a minimum distance of 0.5 mm.

Hereinafter, an arrangement state of the first support protrusion 420 and the second support protrusion 430 will be described in detail with reference to FIGS. 7*a* to 7*d*, 8 and 9.

The first support protrusion 420 and the second support protrusion 430 may be alternately formed in the longitudinal direction of the base part 410 or alternately formed in the width direction of the base part 410.

Here, the first support protrusion 420 and the second support protrusion 430 may be formed to protrude in a hemispherical shape so as to be in point contact with the high-voltage electrode film 200 and the ground electrode film 300, respectively.

Referring to FIG. 7*a*, the support parts 450 may be formed to be positioned between the fastening grooves 440 formed to face each other in the width direction of the base part 410.

That is, the first support protrusion 420 and the second support protrusion 430 may be alternately formed between the fastening grooves 440 formed to face each other in the width direction of the base part 410.

When arranged in this way, since the first support protrusion 420 and the second support protrusion 430 are formed on the same line as the fastening part 500, the intake air flow is not obstructed, and the dust collection performance can be improved.

Referring to FIG. 7*b*, the support parts 450 may be formed between the fastening grooves 440 formed along the longitudinal direction of the base part 410.

That is, the first support protrusion 420 and the second support protrusion 430 may be alternately formed along the width direction between the fastening grooves 440 formed along the length direction of the base part 410.

When arranged in this way, the stacked films are primarily supported by the fastening part 500, and the region not supported by the fastening part 500 is supported by the first support protrusion 420 and the second support protrusion 430. When the region not supported by the fastening part 500 is formed to be long, the film is sagged by its own weight, so that the first support protrusion 420 and the second support protrusion 430 can support this region.

Through this, the number of the fastening parts 500 can be minimized. In addition, as the number of the fastening part 500 decreases, the flow area of the intake air that has been interfered with by the fastening part 500 may be further secured, thereby improving dust collection performance.

Referring to FIG. 7*c*, the support part is formed between the fastening grooves 440 formed to face each other in the width direction of the base part 410, and the arrangement order of the first support protrusion 420 and the second support protrusion 430 between adjacent support parts 450*a*, 450*b* may be formed differently.

More specifically, in any one support part 450*a*, the first support protrusion 420 and the second support protrusion 430 are formed in this order, and in the other adjacent support part 450*b*, the second support protrusion 430 and the first support protrusion 420 may be formed in this order.

That is, the first support protrusion 420 and the second support protrusion 430 may be alternately formed between the fastening grooves 440 formed to face each other in the width direction of the base part 410, and may be formed to protrude to be disposed in a zigzag shape along the longitudinal direction of the base part 410.

When arranged in this way, the support area for supporting the film disposed on the lower side of the stacked films is enlarged, so that the stacked films can be supported more stably.

Referring to FIG. 7*d*, the support part 450 may be formed between the fastening grooves 440 formed along the longitudinal direction of the base part 410 and at positions where the fastening grooves 440 are formed.

That is, the first support protrusion 420 and the second support protrusion 430 are alternately formed with each other along the width direction between the fastening grooves 440 formed along the length direction of the base part 410. In addition, the first support protrusion 420 and the second support protrusion 430 may be alternately formed between the fastening grooves 440 formed to face each other in the width direction of the base part 410.

When arranged in this way, the length of the region not supported by the fastening part 500, that is, the region between the fastening grooves 440 formed along the longitudinal direction of the base part 410 can be formed to be long, and it can prevent the film from sagging by its own weight.

Through this, the number of the fastening part 500 can be minimized, and the air flow area can be further secured, so that the dust collection performance can be improved.

Referring to FIG. 8, in the support part 450, the first support protrusion 420 and the second support protrusion 430 are alternately formed with each other between the fastening grooves 440 formed along the longitudinal direction of the base part 410, and a greater number than the support protrusions shown in FIG. 7*b* may be formed. Although not shown in the drawings, it will be apparent that the support part 450 may be formed to be disposed as shown in FIGS. 7*a*, 7*c*, and 7*d*.

In FIGS. 7*a* to 7*d*, five support protrusions may be formed, and in FIG. 8, seven support protrusions may be formed.

Through this, when the number of the support protrusions increases as shown in FIG. 8, the length in the width direction of the base part 410 can be formed longer, so that the area of the base part 410 can be expanded and the dust collection performance can be improved.

Referring to FIG. 9, the support part may be formed between the fastening grooves 440 formed along the longitudinal direction of the base part 410 and at positions where the fastening grooves 440 are formed.

In addition, the number of the support protrusions of the support part 450*c* provided in the region where the fastening groove 440 is not formed is greater than the number of the support protrusions of the support part 450*d* provided in the region where the fastening grooves 440 are formed.

That is, in the base part 410, since the region in which the fastening groove 440 is not formed is formed to be longer in the width direction than the region in which the fastening grooves 440 are formed, more support protrusions may be formed.

For example, as shown in FIG. 9, seven support protrusions are formed in a support part 450*c* provided in the region where the fastening groove 440 is not formed, and five support protrusions are formed in a support part 450*d* provided in the region where the fastening grooves 440 are formed.

Through this, it is possible to prevent deformation due to its own weight by further forming a support protrusion in a region having a relatively long length in the base part 410.

It will be apparent that the number of the support protrusions in the support part 450 is not limited thereto, and may vary according to the width of the base part 410. That is, when the first support protrusion 420 and the second support protrusion 430 are formed to be symmetrical in the width direction with respect to the longitudinal center line of the base part 410 so as to maintain a constant distance between the stacked films, there is no limit on the number of the support protrusions.

Hereinafter, the support part will be described in more detail with reference to FIGS. 10 to 13.

FIG. 10 is a cross-sectional view schematically showing a state in which the separator film is deformed, FIG. 11 is a cross-sectional view showing the comparison of the heights of the supporting protrusions formed in the width direction of the base part, FIG. 12 is a view schematically showing an analysis range for finite element analysis of the deformation of the separator film, and FIG. 13 is a view schematically showing a measurement point of an amount of deformation and a deformation state through the finite element analysis of the separator film.

Referring to FIG. 10, when the stacking is formed in a state in which the support protrusions 420, 430 protruding from both sides of the separator film 400 have the same height, the deformation of the separator film similar to a deformation curve (C) may be caused by the load of the stacked films and the weight of the separator film.

In the present invention, in order to solve this problem, the height (h2) of an end support protrusion 452 formed at both ends of the base part 410 in the width direction, among the plurality of support protrusions 451, 452 provided on the support part 450, may be formed to be smaller than the height (h1) of a central support protrusion 451 provided in the central portion, as shown in FIG. 11. Through this, the deformation in the width direction of the separator film may be minimized.

In order to confirm that the deformation in the width direction of the separator film is minimized as described above, finite element analysis (FEA) was performed in the present invention.

As shown in FIG. 12, the high-voltage electrode film 200 and the ground electrode film 300 were stacked in a region A of the separator film 400 in which five support protrusions were formed in the region where the fastening grooves were formed and seven support protrusions were formed in the remaining regions, and the finite element analysis was conducted. Since the separator film 400 was symmetrical in the vertical and left-right directions, the behavior of the region A was similar to the overall behavior, and thus the region A was analyzed.

In addition, as shown in FIG. 13, an amount of deformation was measured at the measurement points of the amount of deformation in the area A, a point P1 that was an end of the region where five support protrusions were formed, a point P2 that was an end of the region where the fastening grooves were formed, and a point P3 that was a portion where seven support protrusions were formed.

In addition, in order to compare the deformation, the height of the end support protrusion 452 among the support protrusions of the support part 450 formed in the width direction of the separator film 400 was changed from the same state as the height of the central support protrusion 451 to become smaller, and then the analysis was conducted.

In Condition 1, the height of the support protrusions of the support part in which five support protrusions were formed and the height of the support protrusions of the support part in which seven support protrusions were formed were all set to be 1.4 mm.

In Condition 2, the height of the end support protrusion among the support protrusions of the support part in which the five support protrusions were formed in Condition 1 above was changed to 1.3 mm. In Condition 3, the height of the end support protrusion among the support protrusions of the support part in which five support protrusions were formed in the Condition 1 above was changed to 1.2 mm.

In Condition 4, the height of the end support protrusion among the support protrusions of the support part in which seven support protrusions were formed in Condition 1 above was changed to 1.3 mm.

In Condition 5, the height of the end support protrusion among the support protrusions of the support part in which five support protrusions were formed in Condition 1 above was changed to 1.2 mm, and the height of the end support protrusion among the support protrusions of the support part in which seven support protrusions were formed was changed to 1.3 mm.

The results analyzed under the above conditions were shown in Table 1 below.

TABLE 1

| | | Hight | Amount of deformation [mm] | | | Rate of deformation [%] | | |
|---|---|---|---|---|---|---|---|---|
| Condition | Quantity | [mm] | P1 | P2 | P3 | P1 | P2 | P3 |
| 1 | 5 | 1.4 | −0.32 | −0.37 | 0.23 | 22.6 | 26.1 | 16.4 |
| | 7 | 1.4 | | | | | | |
| 2 | 5 | 1.3 | −0.12 | −0.12 | 0.23 | 8.8 | 8.7 | 16.6 |
| | 7 | 1.4 | | | | | | |
| 3 | 5 | 1.2 | 0.07 | 0.12 | 0.23 | 5.2 | 8.5 | 16.7 |
| | 7 | 1.4 | | | | | | |
| 4 | 5 | 1.4 | −0.33 | −0.44 | 0.02 | 23.9 | 31.6 | 1.1 |
| | 7 | 1.3 | | | | | | |
| 5 | 5 | 1.2 | 0.07 | 0.09 | 0.02 | 4.9 | 6.4 | 1.3 |
| | 7 | 1.3 | | | | | | |

In Table 1 above, the quantity represents the number of support protrusions formed on the support part, and the height represents the height of the end support protrusion among the support protrusions of the support part. In addition, the amount of deformation represents an amount of deformation at the points P1, P2, and P3 of FIG. 13, and the rate of deformation is the absolute value of the amount of deformation with respect to the height (1.4 mm) of the central support protrusion.

As shown in Table 1, when the heights of the support protrusions are all the same (Condition 1), large deformation occurred by 15 to 25% or more at the measurement points compared to the height of the central support protrusion. However, when the height of the end support protrusion was formed 0.1 to 0.2 mm smaller, that is, 5 to 20% smaller than the height of the central support protrusion, it was found that the deformation of less than 10% was occurred at the measurement points, compared to the height of the central support protrusion.

In particular, under Condition 5, the amount of deformation was less than 5% at the point P1, less than 7% at the point P2, and less than 1.5% at the point P3, indicating the minimum deformation.

As shown in FIG. 13, at the point P3, the separator film 400B under Condition 5 was hardly deformed, but a separator film 400A under Condition 1 was largely deformed compared to a separator film 400B under Condition 5 which was hardly deformed.

Therefore, it was confirmed through the above-described finite element analysis that the deformation in the width direction was minimized when the height of the end support protrusion was formed smaller than the height of the central support protrusion among the plurality of support protrusions formed in the width direction on the separator film.

As a result, the support part may be formed so that among the plurality of support protrusions formed in the width direction, the height of the end support protrusion at both ends is formed to be 5 to 20% smaller than another support protrusion, that is, the height of the central support protrusion.

With this configuration, the deformation can be minimized through a height difference between the support protrusions formed in the width direction in the separator film.

FIGS. 14*a* and 14*b* are partial perspective views schematically showing another embodiment of a support part formed on a separator film in a dust collecting filter assembly.

Referring to FIGS. 14*a* and 14*b*, a first support protrusion 421 and a second support protrusion 431 may be provided in a semi-cylindrical shape so as to be in line contact with the high-voltage electrode film 200 and the ground electrode film 300, respectively. That is, compared to the first support protrusion 420 and the second support protrusion 430 formed in a hemispherical shape so as to be in point contact, a support area may be expanded to more stably support the stacked film.

In addition, when the first support protrusion 421 and the second support protrusion 431 are provided in a cylindrical shape, the first support protrusion 421 and the second support protrusion 431 are disposed adjacent to each other in the width direction of the base part 411, and the first support protrusion 421 and the second support protrusion 431 are preferably disposed adjacent to each other in the longitudinal direction of the base part 411. That is, the first support protrusion 421 and the second support protrusion 431 are formed in pairs in the longitudinal direction and width direction of the base part 411, respectively. Through this, it is possible to more stably support the stacked films.

In addition, the first support protrusion 421 and the second support protrusion 431 provided as a pair may be formed between the fastening grooves 441 formed to face in the width direction of the base part 411, as shown in FIG. 14*a*. Alternatively, as shown in FIG. 14*b*, they may be formed between the fastening grooves 441 formed in the longitudinal direction of the base part 411.

The formation positions of the first support protrusion 421 and the second support protrusion 431 provided as a pair may be set to correspond to the size of the base part 411.

FIG. 15 is a partial perspective view schematically showing another embodiment of a separator film in the dust collecting filter assembly, and FIG. 16 is an exploded perspective view schematically showing a dust collecting filter assembly to which the separator film of another embodiment according to FIG. 15 is applied.

Referring to FIGS. 15 and 16, in the separator film 400 according to another embodiment, the first support protrusion 420 and the second support protrusion 430 may include flat surfaces 422, 432 on the protruding ends thereof so that the first support protrusion 420 and the second support protrusion 430 are in surface contact with the high-voltage electrode film 200 and the ground electrode film 300, respectively.

That is, the first support protrusion 420 and the second support protrusion 430 are configured to be in surface contact, so that the stacking can be conducted more stably and the concentrated stress can be dispersed, thereby more effectively preventing film breakage.

In addition, although the dust collecting filter assembly described with respect to FIGS. 3 to 9 is illustrate to having the fastening grooves formed on both sides of the high-pressure electrode film, the ground electrode film, and the separator film, the dust collecting filter assembly of the present invention is not limited thereto.

That is, referring to FIGS. 15 and 16, it may be provided so that fastening grooves are not formed on both sides of the high-voltage electrode film 200, the ground electrode film 300, and the separator film 400. Accordingly, since the fastening groove is not formed, the fastening positions and fastening numbers of the first fastening member 510 and the second fastening member 520 can be freely selected. In this case, the fastening positions and fastening numbers of the first fastening member 510 and the second fastening member 520 may be easily changed to a location and quantity desired by the user in consideration of the stacking height of the films, the width of the film, or the internal structure of the product in which the dust collecting filter assembly is assembled.

Hereinafter, a method for manufacturing the dust collecting filter assembly of the present invention will be described with reference to the accompanying drawings.

FIG. 17 is a flowchart schematically showing a method for manufacturing a dust collecting filter assembly according to an embodiment of the present invention, and FIG. 17 is a view schematically showing a manufacturing method of the dust collecting filter assembly. Here, FIG. 17 is a view sequentially showing a manufacturing sequence of the dust collecting filter assembly in the sequence of FIGS. 18*a* to 18*e*.

Referring to FIGS. 17 and 18, the method for manufacturing a dust collecting filter assembly according to an embodiment of the present invention includes a film stacking step (S110) of stacking films so that the separate film 400 is disposed between the high-voltage electrode film 200 and the ground electrode film 300 while the high-voltage electrode film 200 and the ground electrode film 300 are alternately inserted into a stacking jig 600, a film pressing step (S120) of pressing the stacked films with the weight of a press jig 700 and supporting the stacked films, and a film fastening step (S130) of fastening the fastening parts 500 to both sides of the stacked films.

As such, the method for manufacturing the dust collecting filter assembly of the present invention requires the stacking jig 600 and the press jig 700.

More specifically, the stacking jig 600 is provided with a stacking block 610 and a guide rail 620 fastened in a vertical direction at both ends of the stacking block 610 and having a guide slit 621 formed in the longitudinal direction. In addition, through-holes 611 are formed in the stacking block 610 so that both ends of the first fastening member 510 and the second fastening member 520 of the fastening part 500 are inserted.

The press jig 700 is provided to be inserted into the guide slit 621. That is, when the press jig 700 is inserted into the guide slit 621 after the films are staked on the guide rail 620, the stacked films may be pressed and supported into close contact with each other by the weight of the press jig 700. In addition, through holes 710 are formed in the press jig 700 so that both ends of the first fastening member 510 and the second fastening member 520 of the fastening part 500 are inserted.

A method for manufacturing the dust collecting filter assembly using the stacking jig 600 and the press jig 700 will be described with reference to FIG. 17.

Referring to FIG. 18*a*, in the film stacking step (S110), the ground electrode film 300, the separator film 400, the high-voltage electrode film 200, and the separator film 400 are stacked by sequentially inserting their both ends into the guide slit 621 formed on the guide rail 620. Also, although not shown in the drawings, it will be apparent that the high-voltage electrode film may be preferentially inserted, then the separator film and the ground electrode film may be stacked in that order.

Referring to FIG. 18*b*, in the film pressing step (S120), when the plurality of films is stacked on the upper surface of the stacking block 610 so that the film stacking step (S110) is completed, the press jig 700 is inserted into the guide slit 621. At this time, the stacked films can be supported in close contact by pressing the films by the weight of the press jig 700.

Referring to FIG. 18*c*, in the film fastening step (S130), when the films stacked by the press jig 700 are in close contact, both ends of the first fastening member 510 and both ends of the second fastening member 520 are inserted through the through holes 611 of the stacking block 610 and the through holes 710 of the press jig 700, so that the first fastening member 510 and the second fastening member 520 are fastened to each other. Here, the hook 511 is formed at both ends of the first fastening member 510, and locking hole 521 is formed at both ends of the second fastening member 520, so that the hook 511 is fitted into the locking hole 521 so that the first fastening member 510 and the second fastening member 520 are fastened. Accordingly, the fastening part 500 may be fastened as shown in FIG. 18*d*.

In this way, when the film fastening step (S130) is completed, after removing the press jig 700 from the guide rail 620, the dust collecting filter assembly 100 is separated from the guide rail 620 to manufacture the dust collecting filter assembly 100.

FIGS. 19*a* and 19*b* are views schematically showing a state of assembling the dust collecting filter assembly shown in FIG. 16 using the method for manufacturing the dust collecting filter assembly according to an embodiment of the present invention.

In the method for manufacturing the dust collecting filter assembly described with reference to FIGS. 18*a* to 18*e*, the fastening grooves are formed on both sides of the stacked films so the fastening position is limited by inserting the first fastening member 510 and the second fastening member 520 inserted into the fastening grooves.

On the other hand, in the method for manufacturing the dust collecting filter assembly described with reference to FIGS. 19*a* and 19*b*, since the fastening groove is not formed on both sides of the stacked films, the fastening positions and fastening numbers of the first fastening member 510 and the second fastening member 520 can be freely selected.

Compared with the method for manufacturing a dust collecting filter assembly of the present invention, in the conventional method for manufacturing the dust collecting unit 10 shown in FIG. 1, an operator must directly insert the dielectric films 14 one by one into the fastening grooves 13 of the fastening parts 12 in the casing 11 made of molding product, so that there are problems in that it takes a lot of work time and increases the manufacturing cost.

However, in the method for manufacturing a dust collecting filter assembly of the present invention, the films are stacked in a manner of simply inserting the films into the guide slit 621 of the guide rail 620 and then the fastening part 500 is fastened to manufacture the dust collecting filter assembly 100, so the working time can be significantly reduced compared to the conventional manufacturing method. In addition, it is possible to significantly reduce the manufacturing cost by automating the manufacturing process through an automated facility.

As described above, although the present invention has been described with reference to limited embodiments and drawings, the present invention is not limited thereto, and it is apparent that various modifications and variations are possible by those of ordinary skill in the art to which the present invention pertains within the scope of equivalents of the technical spirit of the present invention and the claims to be described below.

The invention claimed is:

1. An air conditioner, comprising:

a main body provided with an inlet and an outlet;

a blower provided in the main body, that suctions air in through the inlet and blows the air out through the outlet; and a dust collecting filter assembly provided in the main body and that collects foreign substances from the air suctioned in through the inlet, wherein the dust collecting filter assembly includes:

a high-voltage electrode film;

a ground electrode film disposed adjacent to the high-voltage electrode film;

a separator film disposed between the high-voltage electrode film and the ground electrode film so that the high-voltage electrode film and the ground electrode film are spaced apart by a predetermined interval, wherein the separator film comprises a plurality of support protrusions formed in a widthwise direction having different heights to prevent deformation in a stacked state; and a fastener that fastens the high-voltage electrode film, the ground electrode film, and the separator film together to integrate them.

2. The air conditioner according to claim 1, wherein the plurality of support protrusions protrudes from both sides of the separator film, the plurality of support protrusions spacing the high-voltage electrode film and the ground electrode film apart from each other by the predetermined interval.

3. The air conditioner according to claim 1, wherein the separator film further includes a base part provided in a flat plate shape, and wherein the plurality of support protrusions protruding directions of which are alternately formed in a direction opposite to each other in the widthwise direction of the base are spaced apart from each other by a predetermined distance in a longitudinal direction of the base.

4. The air conditioner according to claim 3, wherein a height of support protrusions formed at both ends in the widthwise direction of the base among the plurality of support protrusions is smaller than a height of other support protrusions.

5. The air conditioner according to claim 4, wherein five or more support protrusions are formed in an odd number in the widthwise direction of the base.

6. The air conditioner according to claim 5, wherein the height of the support protrusions formed at both ends is 5 to 20% smaller than the height of the other support protrusions.

7. The air conditioner according to claim 3, wherein a distance between the plurality of support protrusions formed in the widthwise direction of the base is the same.

8. The air conditioner according to claim 3, wherein the plurality of support protrusions is arranged alternately with each other in a longitudinal direction of the base, or alternately arranged with each other in the widthwise direction of the base.

9. The air conditioner according to claim 3, wherein the high-voltage electrode film, the ground electrode film, and the separator film each has fastening grooves formed on longer sides thereof into which the fastener is inserted.

10. The air conditioner according to claim 9, wherein the fastening grooves of the separator face in the widthwise direction of the base, and is a region in which the fastening grooves are formed and a remaining region in which the plurality of support protrusions is formed.

11. The air conditioner according to claim 10, wherein a number of the support protrusions formed between the fastening grooves is less than a number of the support protrusions formed in the remaining region.

12. The air conditioner according to claim 3, wherein each support protrusion protrudes in a hemispherical shape so as to be in point contact with the high-voltage electrode film and the ground electrode film, respectively.

13. The air conditioner according to claim 3, wherein the each support protrusion protrudes in a semi-cylindrical shape so as to be in line contact with the high-voltage electrode film and the ground electrode film, respectively.

14. The air conditioner according to claim 3, wherein a flat surface is formed at a protruding end of each support protrusion so as to be in surface contact with the high-voltage electrode film and the ground electrode film, respectively.

15. The air conditioner according to claim 1, wherein the fastener includes a first fastening member disposed on one side of a stack of the high-voltage electrode film, the ground electrode film, and the separator film, both ends of the first fastener member being bent to support the stack, the first fastening member being placed on one longer side of the stack; and a second fastening member disposed on the other longer side of the stack of the high-voltage electrode film, the ground electrode film, and the separator film, both ends of the second fastener member being bent to support the stack, the second fastening member being placed on the outermost side of the stack and fitted and fastened to the both ends of the first fastening member.

16. The air conditioner according to claim 15, wherein the first fastening member is inserted into a fastening groove formed on the one longer side of the stack of the high-voltage electrode film, the ground electrode film, and the separator film, and the second fastening member is inserted into a fastening groove formed on the other longer side of the stack of the high-voltage electrode film, the ground electrode film, and the separator film.

17. The air conditioner according to claim 16, wherein the first fastening member and the second fastening member have a plurality of slit grooves formed along a longitudinal direction into which the high-voltage electrode film, the separator film, and the ground electrode film are respectively inserted.

18. An air conditioner, comprising:

a main body provided with an inlet and an outlet;

a blower provided in the main body, that suctions air in through the inlet and blows the air out through the outlet; and a dust collecting filter assembly provided in the main body and that collects foreign substances from the air suctioned in through the inlet, wherein the dust collecting filter assembly includes:

a plurality of high-voltage electrode layers;

a plurality of ground electrode layers each disposed adjacent to the plurality of high-voltage electrode layers;

a plurality of separator layers disposed, respectively, between the plurality of high-voltage electrode layers and the plurality of ground electrode layers so that the high-voltage electrode layers and the ground electrode layers are spaced apart by a predetermined interval, wherein each separator layer comprises a plurality of support protrusions formed in a widthwise direction having different heights to prevent deformation in a stacked state; and a fastener that fastens the plurality of high-voltage electrode layers, the plurality of ground electrode layers, and the plurality of separator layers together.

19. The air conditioner according to claim 18, wherein the plurality of support protrusions protrudes from both sides of the respective separator layers, the plurality of support protrusions spacing the plurality of high-voltage electrode layers and the plurality of ground electrode layers apart from each other by the predetermined interval.

20. The air conditioner according to claim 18, wherein the separator film further includes a base provided in a flat plate shape, and wherein the plurality of support protrusions protruding directions of which are alternately formed in a direction opposite to each other in the widthwise direction of the base are spaced apart from each other by a predetermined distance in a longitudinal direction of the base.

* * * * *